United States Patent
Yoon

(10) Patent No.: US 7,826,026 B2
(45) Date of Patent: Nov. 2, 2010

(54) LIQUID CRYSTAL DISPLAY DEVICE AND METHOD FOR FABRICATING THE SAME

(75) Inventor: Sunghoe Yoon, Kyeongki-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/457,113

(22) Filed: Jun. 1, 2009

(65) Prior Publication Data

US 2009/0305444 A1     Dec. 10, 2009

Related U.S. Application Data

(62) Division of application No. 11/117,574, filed on Apr. 29, 2005, now Pat. No. 7,557,891.

(30) Foreign Application Priority Data

Apr. 30, 2004   (KR) .................. 10-2004-030533

(51) Int. Cl.
G02F 1/1339   (2006.01)
G02F 1/1343   (2006.01)
G02F 1/1333   (2006.01)

(52) U.S. Cl. .................. 349/155; 349/141; 349/158

(58) Field of Classification Search .................. 349/155, 349/156, 141, 158
See application file for complete search history.

(56) References Cited

U.S. PATENT DOCUMENTS

| 7,701,540 | B2* | 4/2010 | Choi | 349/141 |
| 2005/0157245 | A1* | 7/2005 | Lin et al. | 349/155 |
| 2005/0185129 | A1* | 8/2005 | Kim et al. | 349/156 |
| 2006/0066801 | A1* | 3/2006 | Liu et al. | 349/155 |
| 2007/0019151 | A1* | 1/2007 | Heo et al. | 349/156 |

FOREIGN PATENT DOCUMENTS

| CN | 1363851 A | 8/2002 |
| CN | 1487346 A | 4/2004 |
| JP | 2002-182220 | 6/2002 |
| JP | 2002-341354 | 11/2002 |

OTHER PUBLICATIONS

Communication from Korean Patent Office dated Apr. 11, 2006.

* cited by examiner

*Primary Examiner*—Mike Qi
(74) *Attorney, Agent, or Firm*—McKenna Long & Aldridge

(57) ABSTRACT

A liquid crystal display device includes a first substrate having a step difference part; a second substrate facing the first substrate; a column spacer between the first substrate and the second substrate, a contact surface of the column spacer with the step difference part of the first substrate including a plurality of protrusions; and a liquid crystal layer between the first substrate and the second substrate.

9 Claims, 28 Drawing Sheets

LIQUID CRYSTAL DISPLAY DEVICE AND METHOD FOR FABRICATING THE SAME

This application is a divisional of U.S. patent application Ser. No. 11/117,574, filed on Apr. 29, 2005 now U.S. Pat. No. 7,557,891, which claims the benefit of the Korean Application No. P2004-30533 filed on Apr. 30, 2004, all of which are hereby incorporated by reference in their entirety for all purposes as is set forth herein.

BACKGROUND OF THE INVENTION

1. Field of the Invention

The present invention relates to a liquid crystal display (LCD) device, and more particularly, to an LCD device with a column spacer.

2. Discussion of the Related Art

Much effort has been devoted to research and develop various display devices to address the demand of information-driven society. In particular, flat panel display devices are in high demand. They include liquid crystal display (LCD) device, plasma display panel (PDP), electroluminescent display (ELD) and vacuum fluorescent display (VFD). These flat panel display devices have already been applied in some form to various display equipment.

Among the various flat display devices, the LCD device has been most widely used because it is compact, thin, and consumes low power. The LCD device is increasingly being used as a substitute for Cathode Ray Tube (CRT). In addition to being used on mobile devices such as notebook computers, LCD devices have been developed as computer monitors and television displays.

Despite various technical advances in LCD technology with applications in different fields, research in picture quality enhancement of the LCD device has been lagging other features and advantages of the LCD device. Whether LCD devices become ubiquitous as a general purpose display, will depend on their capabilities in achieving high quality picture, such as high resolution and high luminance with a large screen while remaining light, thin, and low power consuming.

FIG. 1 is an exploded perspective view of a related art LCD device. Referring to FIG. 1, the related art LCD device includes first and second substrates 1 and 2, and a liquid crystal layer 3 formed by injection between the first and second substrates 1 and 2. Specifically, the first substrate 1 includes a plurality of gate lines 4 arranged along a first direction at fixed intervals, a plurality of data lines 5 arranged along a second direction perpendicular to the first direction at fixed intervals, a plurality of pixel electrodes 6 arranged in a matrix-type configuration within pixel regions P defined by crossing of the gate and data lines 4 and 5, and a plurality of thin film transistors T at respective crossing points of the gate and data lines 4 and 5. The thin film transistors T apply a data signal from the data line to each pixel electrode 6 according to a gate signal of the gate line. The second substrate 2 includes a black matrix layer 7 that shields light from the predetermined portions of the first substrate 1 except for the pixel regions, an R, G and B color filter layer 8 for representing various colors in correspondence with the pixel regions, and a common electrode 9 on the color filter layer 8 to render images.

In the related art LCD device, since the liquid crystal layer 3 is formed between the first and second substrates 1 and 2, liquid crystal molecules of the liquid crystal layer 3 are driven by an electric field generated between the pixel electrode 6 and the common electrode 9. For example, an alignment direction of the liquid crystal molecules of the liquid crystal layer 3 is controlled by the induced electric field between the pixel electrode 6 and the common electrode 9. Accordingly, the amount of light transmitted through the liquid crystal layer 3 may be controlled by the alignment direction of the liquid crystal molecules, thereby displaying images. The related art LCD device described above is commonly referred to as a Twisted Nematic (TN) mode LCD device, which has a narrow viewing angle.

In order to overcome the problem associated with the TN mode LCD device, an In-Plane Switching (IPS) mode LCD device has been developed. In the IPS mode LCD device, a pixel electrode and a common electrode are formed in parallel at a predetermined interval within a pixel region. Accordingly, an electric field parallel to the substrates is generated between the pixel electrode and the common electrode, thereby aligning liquid crystal molecules of a liquid crystal layer parallel to the substrates.

A method of fabricating a related art IPS mode LCD device will be described as follows. Generally, the method of fabricating the LCD device is categorized as a liquid crystal injection method and a liquid crystal dispensing method, according to how the liquid crystal layer is formed between the two substrates.

FIG. 2 is a flow chart of a method of fabricating a liquid crystal injecting type LCD device according to the related art. The method for fabricating an LCD device is divided into three processes, including an array process, a cell process, and a module process. The array process mainly includes two steps: forming a TFT array having gate and data lines, common electrodes, and thin film transistors on the first substrate; and forming a color filter array having a black matrix layer, a color filter layer, and a common electrode on the second substrate.

During the array process, a plurality of LCD panels are formed together on one large mother glass substrate. The TFT array and the color filter array are formed on each of the LCD panels. Then, the TFT substrate and the color filter substrate are moved to a cell process line. Subsequently, an alignment material is coated on the TFT substrate and the color filter substrate. Then, an alignment process (rubbing process) S10 is performed on the substrates to obtain a uniform alignment direction of liquid crystal molecules. The alignment process S10 is carried out by the following steps: cleaning the substrate before coating an alignment layer thereon, printing the alignment layer, baking the alignment layer, inspecting the alignment layer, and rubbing the alignment layer. Then, the TFT substrate and the color filter substrate are respectively cleaned (S20).

Next, ball spacers for maintaining a cell gap between the two substrates are scattered on one of the two substrates (S30). A seal pattern is formed corresponding to the circumference of respective LCD panel regions to bond the two substrates to each other (S40). The seal pattern includes an inlet through which liquid crystal is injected. In this case, the ball spacers may be formed of plastic balls or minute elastic particles. Then, the TFT substrate and the color filter substrate having the seal pattern therebetween are positioned facing each other, and are bonded to each other. Then, the seal pattern is cured (S50).

Thereafter, the bonded TFT and color filter substrates are cut into respective LCD panel regions (S60), thereby fabricating the unit LCD panels, each having a pre-determined size. Then, the liquid crystal is injected to the LCD panel through the inlet, and the inlet is sealed (S70), thereby forming a liquid crystal layer. After performing an inspection process (S80) for observing external appearances and testing for electric failures in the LCD panel, the process of fabricating the LCD device is completed.

During the process for injecting the liquid crystal, the LCD panel and a container having liquid crystal therein are provided in a vacuum chamber. Accordingly, moisture and air bubbles in the liquid crystal and the container are simultaneously removed, and an interior space of the LCD panel is maintained in a vacuum state. Then, the inlet of the LCD panel is dipped into the container having the liquid crystal in the vacuum state, and the vacuum state inside the chamber is changed to the atmospheric pressure. Thus, the liquid crystal is injected into the interior of the LCD panel through the inlet according to a pressure difference between the interior of the LCD panel and the vacuum chamber.

The liquid crystal injection method has the following disadvantages. First, after cutting the large mother glass substrate into the respective LCD panel regions, the inlet is dipped into the container having the liquid crystal while maintaining the vacuum state between the two substrates. Significant amount of time are required for injecting the liquid crystal between the two substrates, thereby lowering yield. When forming large LCD devices, it is difficult to completely inject the liquid crystal into the innermost portion of the LCD panel, thereby causing defect due to incomplete injection of the liquid crystal. Furthermore, several liquid crystal injection devices are required due to the complicated process and the considerable process time, thereby requiring large spaces for housing the several devices. Also, if the ball spacers are used in the LCD device, the ball spacers may lump together, thereby causing a Milky Way defect of generating glitter. Also, the ball spacers are scattered, whereby the ball spacers may be moved within the pixel region, thereby causing light leakage.

In order to overcome these problems of the liquid crystal injection method, the liquid crystal dispensing method has been developed, in which two substrates are bonded to each other after dispensing liquid crystal on any one of the two substrates. FIG. 3 is a flow chart of a method of fabricating a liquid crystal dispensing type LCD device according to the related art. In the liquid crystal dispensing method, before bonding the two substrates, the liquid crystal is dispensed on any one of the two substrates. Accordingly, it is impossible to use ball spacers for maintaining a cell gap between the two substrates since the ball spacers move to a dispensing direction of the liquid crystal. Thus, instead of the ball spacers, patterned spacers or column spacers are fixed to the substrate to maintain the cell gap between the two substrates. During an array process, a black matrix layer, a color filter layer, and a common electrode are formed on the color filter substrate. Then, a photosensitive resin is formed on the common electrode, and is selectively removed to form the column spacers above the black matrix layer. The column spacers may be formed in a photo process or an ink-jet process.

Then, alignment layers are respectively coated on the entire surfaces of the TFT substrate and the color filter substrate including the column spacers, and a rubbing process is performed thereto. After cleaning the TFT substrate and the color filter substrate (S101), the liquid crystal is dispensed on one of the two substrates (S102), and a seal pattern is formed in the circumference of an LCD panel region on the other substrate by a dispensing apparatus (S103). At this time, it is possible to dispense the liquid crystal and form the seal pattern together on one of the two substrates. The other substrate having no liquid crystal dispensed thereon is inversed (S104). Then, the TFT substrate and the color filter substrate are bonded to each other by pressure, and the seal pattern is cured (S105).

Subsequently, the bonded substrates are cut into the respective LCD panels (S106). In addition, an inspection process (S107) for observing external appearances and tests for electric failures in the LCD panel are performed. The process of fabricating the LCD device is complete.

In the liquid crystal dispensing method, the column spacers are formed on the color filter substrate. Liquid crystal is dispensed on the TFT substrate. Then the two substrates are bonded to each other, thereby forming the LCD panel. The column spacers are fixed on the color filter substrate, and are in contact with the TFT substrate. Also, when the column spacers are in contact with the TFT substrate, the contact portion corresponds to one of the gate line and the data line. That is, each of the column spacers is formed on the color filter substrate at a predetermined height.

FIG. 4 is a plane view of a related art LCD device. FIG. 5 is a cross-sectional view along I-I' of FIG. 4. As shown in FIG. 4 and FIG. 5, an array area of the related art LCD device includes a gate line 4, a data line 5, a thin film transistor TFT, and a pixel electrode 6. At this time, the gate line 4 is formed perpendicular to the data line 5, to define a pixel region, and the thin film transistor TFT is formed at a crossing of the gate line 4 and the data line 5. Also, the pixel electrode 6 is formed in the pixel region. Then, column spacers 20 are formed at fixed intervals, to maintain a cell gap. In this case, as shown in FIG. 5, the column spacer 20 is formed above the gate line 4. That is, the gate line 4 is formed on a first substrate 1, and a gate insulating layer 15 is formed on the entire surface of the first substrate 1 including the gate line 4. Then, a passivation layer 16 is formed on the gate insulating layer 15.

Also, a second substrate 2 includes a black matrix layer 7, a color filter layer 8, and a common electrode 14. The black matrix layer 7 is formed on the second substrate 2 to cover the non-pixel portions (gate line, data line, and thin film transistor) except for the pixel regions. The color filter layer 8 is formed on the second substrate 2 including the black matrix layer 7 by forming R, G and B pigments in correspondence with the pixel regions. Then, the common electrode 14 is formed on the entire surface of the second substrate 2 including the color filter layer 8. The column spacer 20 is formed on the common electrode 14 corresponding to the gate line 4. Then, the first substrate 1 and the second substrate 2 are bonded to each other while the column spacer 20 is positioned in correspondence with the gate line 4.

The liquid crystal dispensing type LCD device having the column spacer has the following disadvantages. First, the column spacers are fixed to one substrate, and the flat surface of column spacers is in contact with the TFT substrate, causing a great frictional force due to the large contact surface with the substrates. Accordingly, when the screen of the LCD device having the column spacers is rubbed, it generates touch spots on the screen for a long time.

FIG. 6A and FIG. 6B are a plane view and a cross-sectional view, respectively, illustrating spots generated on the screen by touching the LCD panel. If the LCD panel 10 is continuously touched with a finger or a pen along a predetermined direction, as shown in FIG. 6A, the upper substrate 2 of the LCD panel 10 is shifted at a predetermined interval in the touch direction, as shown in FIG. 6B. If the cylindrical column spacers are in contact with the lower and upper substrates 1 and 2, it may cause a great frictional force between the column spacers and the two opposing substrates. Thus, the liquid crystal molecules between the column spacers are not restored to their original state, thereby generating the spots on the screen. Also, when the LCD panel is touched with the finger or pen along the predetermined direction, the liquid crystal molecules gather around the touched portion causing a protrusion. In this case, the cell gap h1 corresponding to the protruding portion is higher than the cell gap h2 of the remaining portions, thereby generating light leakage. Then, it is impossible to obtain a uniform luminance across the LCD device.

In the LCD device of forming the column spacers, the spots may be generated by touch since the column spacers are fixed to one substrate, and the column spacers contact the opposing substrate on a flat surface. Thus, the contact area of the column spacers with the substrates is larger than the contact area of the ball spacers in the related art LCD device described earlier.

Another reason for spots generation is that the contact area between the substrate and the column spacers is in a vacuum state when the substrate is touched. When ball spacers are used, the ball spacers may be moved in all directions if the facing substrate is touched. Thereby, the contact area between the surface of the substrate and the ball spacers is not maintained in the vacuum state when the surface of the LCD panel is touched. In contrast, when the column spacers are used, if the upper surfaces of the column spacers are in contact with the flat surface of the facing substrate, the contact area is in the vacuum state. Accordingly, when the LCD device uses column spacers, the spots are generated when the surface of the LCD panel is touched, due to the large contact area between the column spacers and the opposing substrate, or due to the vacuum state between the flat surface of the substrate and the upper surfaces of the column spacers.

In the LCD device formed with the liquid crystal injection method, the appropriate amount of liquid crystal is injected inside the LCD panel due to the difference in pressure between the inside of the LCD panel, which is in the vacuum state, and the inside of the chamber, which is under the atmospheric pressure, thereby completing the LCD panel. In the liquid crystal dispensing method, the LCD panel is completed by dispensing the predetermined amount of liquid crystal is on one substrate, and then bonding the two substrates are bonded to each other.

Accordingly, in the liquid crystal injection method, the appropriate amount of liquid crystal is injected due to the pressure difference irrespective of the structures formed on the two substrates inside the LCD panel. However, in the liquid crystal dispensing method, it is difficult to predetermine the amount required to each of the LCD panels, due to variations in sizes and intervals for the structures generated by the fabrication margin in the LCD panels. In the liquid crystal dispensing method, the amount of liquid crystal provided to the LCD panel may be excessive. As a result, when excessive liquid crystal is provided, or the liquid crystal is maintained at a high temperature, lower portions of the LCD panel are protruding due to the gravity defect. That is, the liquid crystal molecules may gather to some lower portions of the LCD, because of the excessive amount of liquid crystal provided to the inside of the LCD panel.

Generally, the LCD device is used as a display device for television, notebook and desktop computers. In these applications, the LCD panel of the LCD device usually stands vertically. In this case, the liquid crystal molecules of the LCD panel move and gather to a lower portion thereof due to the effects of gravity. Specifically, when the LCD panel is maintained at the high temperature, the thermal expansion of liquid crystal increases, aggravating the problem. The aforementioned problems of the spots and the gravity defect become more serious in large LCD devices because, then, it is difficult to dispense the liquid crystal on the entire surface of the LCD panel.

SUMMARY OF THE INVENTION

Accordingly, the present invention is directed to a liquid crystal display device and a method for fabricating the same that substantially obviates one or more problems due to limitations and disadvantages of the related art.

An object of the present invention is to provide an LCD device having a reduced contact area between a column spacer and substrates of the LCD device.

Another object of the present invention is to provide a method for fabricating an LCD device having a reduced contact area between a column spacer and substrates of the LCD device.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, a liquid crystal display device includes a first substrate having a step difference part; a second substrate facing the first substrate; a column spacer between the first substrate and the second substrate, a contact surface of the column spacer with the step difference part of the first substrate including a plurality of protrusions; and a liquid crystal layer between the first substrate and the second substrate.

In another aspect, the liquid crystal display device includes a first substrate and a second substrate facing each other; a gate line and a data line crossing each other perpendicularly on the first substrate to define a pixel region; a thin film transistor at a crossing of the gate line and the data line; common electrodes and pixel electrodes alternately provided in the pixel region; a black matrix layer on the second substrate corresponding to portions of the first substrate excluding the pixel region; a color filter layer formed on the second substrate corresponding to the pixel region of the first substrate; an overcoat layer on the entire surface of the second substrate including the black matrix layer and the color filter layer; a column spacer on the overcoat layer facing the thin film transistor of the first substrate, the column spacer having a plurality of protrusions on a contact surface thereof; and a liquid crystal layer between the first and second substrates.

In another aspect, the liquid crystal display device includes a first substrate and a second substrate facing each other; gate and data lines crossing each other perpendicularly on the first substrate to define a pixel region; a thin film transistor at a crossing of the gate and data lines; a protruding pattern on the gate line; common electrodes and pixel electrodes alternately provided in the pixel region; a black matrix layer on portions of the second substrate excluding portions corresponding to the pixel region of the first substrate; a color filter layer on the second substrate corresponding to the pixel region; an overcoat layer on the entire surface of the second substrate including the black matrix layer and the color filter layer; a column spacer on the overcoat layer facing the protruding pattern, the column spacer having a plurality of protrusions on a contact surface thereof; and a liquid crystal layer between the first substrate and the second substrate.

In another aspect, the liquid crystal display device includes a first substrate and a second substrate facing each other; gate and data lines crossing each other perpendicularly on the first substrate to define a pixel region; a thin film transistor at a crossing of the gate and data lines; a pixel electrode in the pixel region; a black matrix layer on portions of the second substrate excluding portions corresponding to the pixel region of the first substrate; a color filter layer on the second substrate corresponding to the pixel region; a common electrode on the entire surface of the second substrate including the black matrix layer and the color filter layer; a column spacer on the common electrode, the column spacer facing the thin film transistor, and the column spacer including a plurality of protrusions on a contact surface thereof; and a liquid crystal layer between the first and second substrates.

In another aspect, the liquid crystal display device includes a first and a second substrate facing each other; gate and data lines crossing each other on the first substrate to define a pixel region; a thin film transistor at a crossing of the gate and data lines; a protruding pattern on the gate line; a pixel electrode in the pixel region; a black matrix layer on portions of the second substrate excluding portions corresponding to the pixel region of the first substrate; a color filter layer on the second substrate corresponding to the pixel region; a common electrode on the entire surface of the second substrate including the black matrix layer and the color filter layer; a column spacer on the common electrode, the column spacer facing the protruding pattern, wherein the column spacer has a plurality of protrusions on a contact surface thereof; and a liquid crystal layer between the first and second substrates.

In another aspect, a method for fabricating a liquid crystal display device includes forming a step difference part on a TFT array substrate; preparing a color filter array substrate facing the TFT array substrate; coating a photosensitive resin on the entire surface of the color filter array substrate; forming a column spacer having a plurality of protrusions facing the step difference part of the TFT array substrate by exposing and developing the photosensitive resin; dispensing liquid crystal on the TFT array substrate; and bonding the TFT array substrate and the color filter array substrate to each other.

In another aspect, the method for fabricating the liquid crystal display device includes forming a step difference part on a TFT array substrate; preparing a color filter array substrate facing the TFT array substrate; coating a photosensitive resin on the entire surface of the color filter array substrate; forming a column spacer having a plurality of protrusions facing the step difference part of the TFT array substrate by selectively removing the photosensitive resin; dispensing liquid crystal on the TFT array substrate; and bonding the TFT array substrate and the color filter array substrate to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
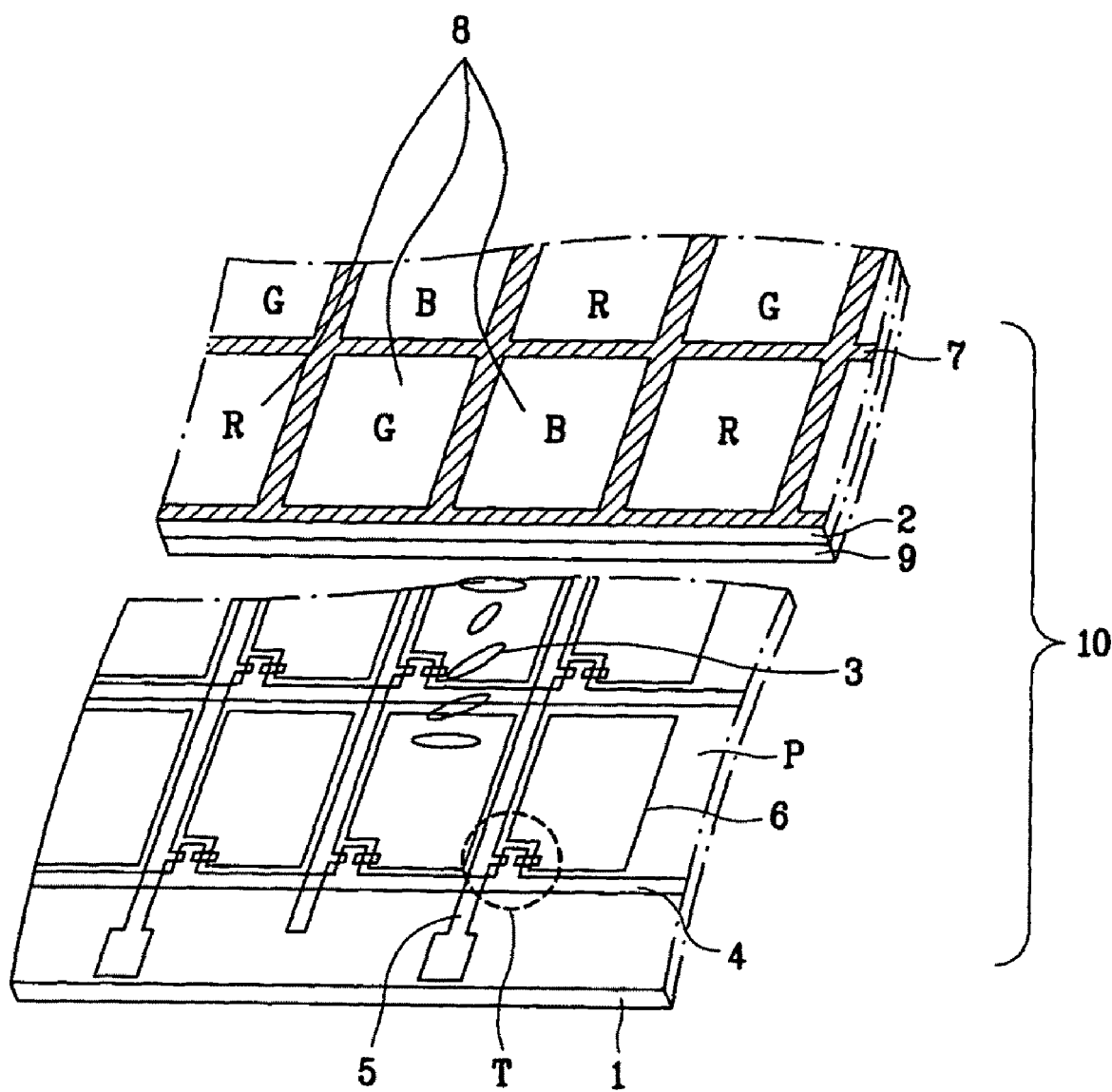
FIG. 1 is an exploded perspective view of a related art LCD device.
Figure 2:
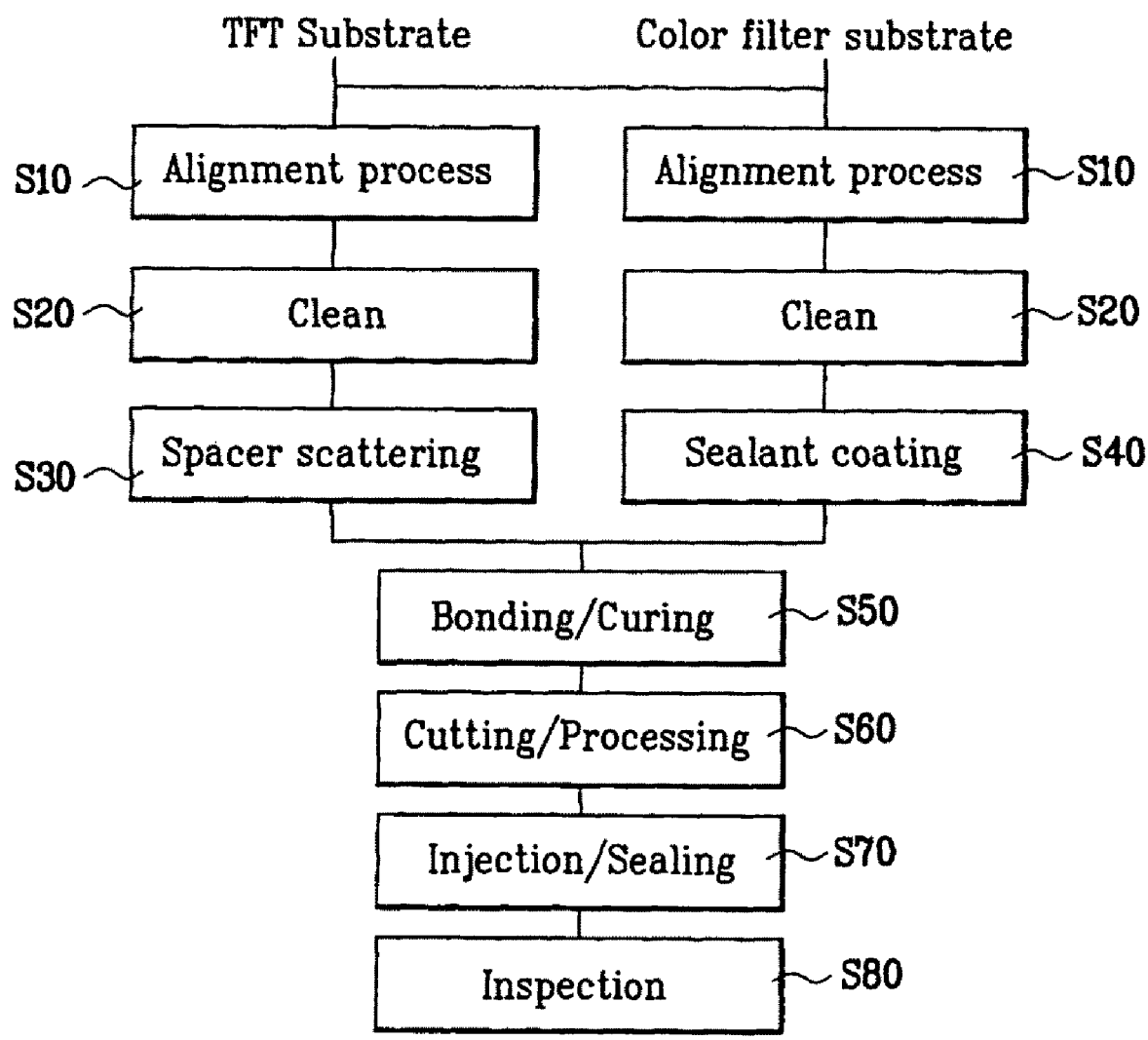
FIG. 2 is a flow chart of a method of fabricating a liquid crystal injecting type LCD device according to the related art.
Figure 3:
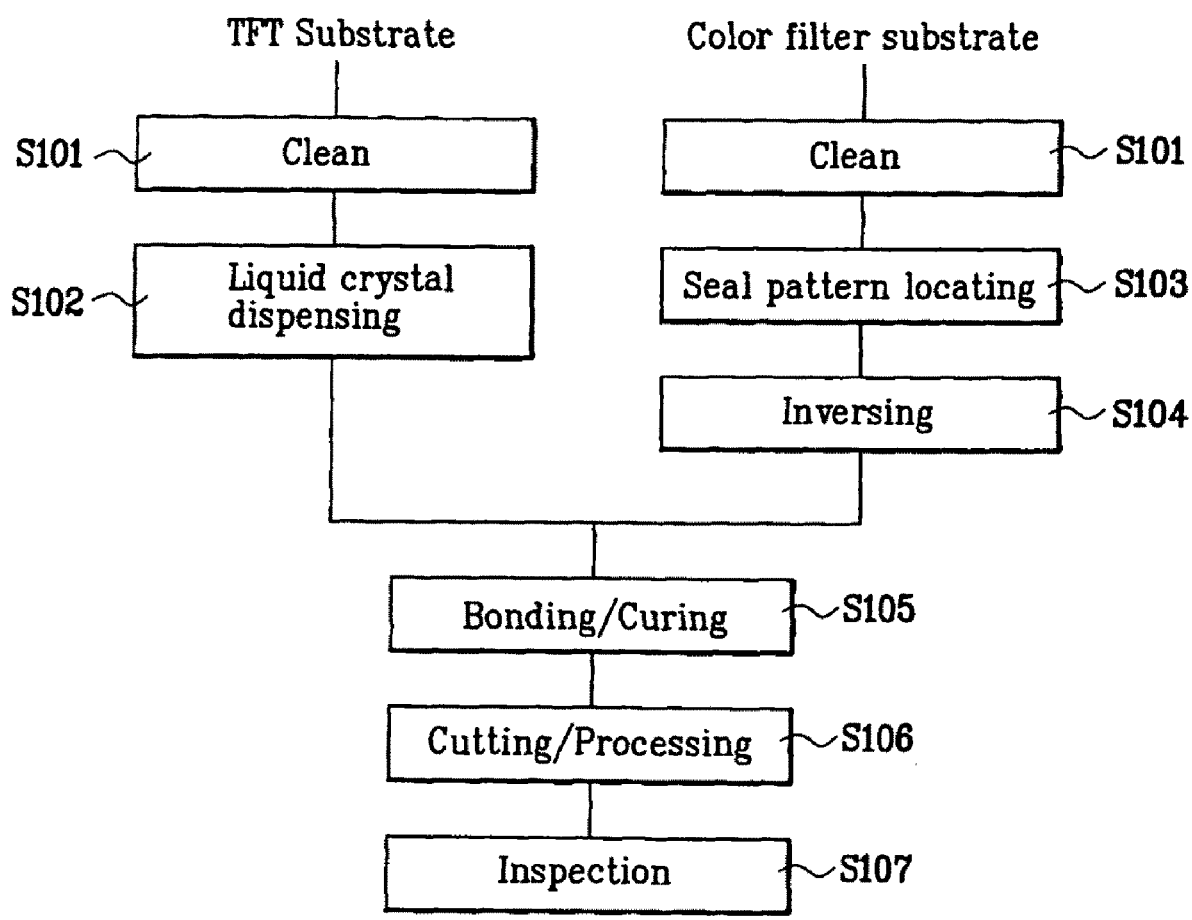
FIG. 3 is a flow chart of a method of fabricating a liquid crystal dispensing type LCD device according to the related art.
Figure 4:
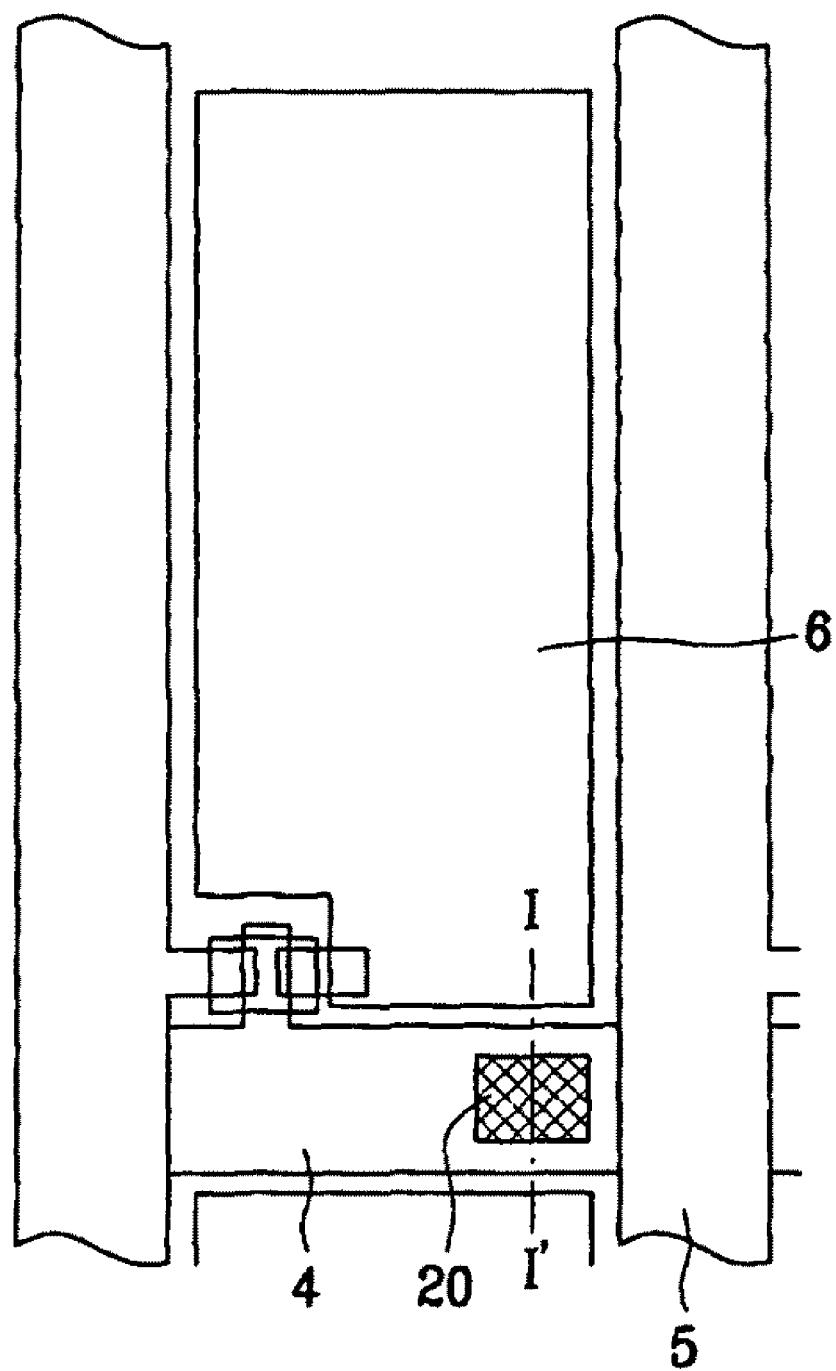
FIG. 4 is a plane view of the related art LCD device.
Figure 5:
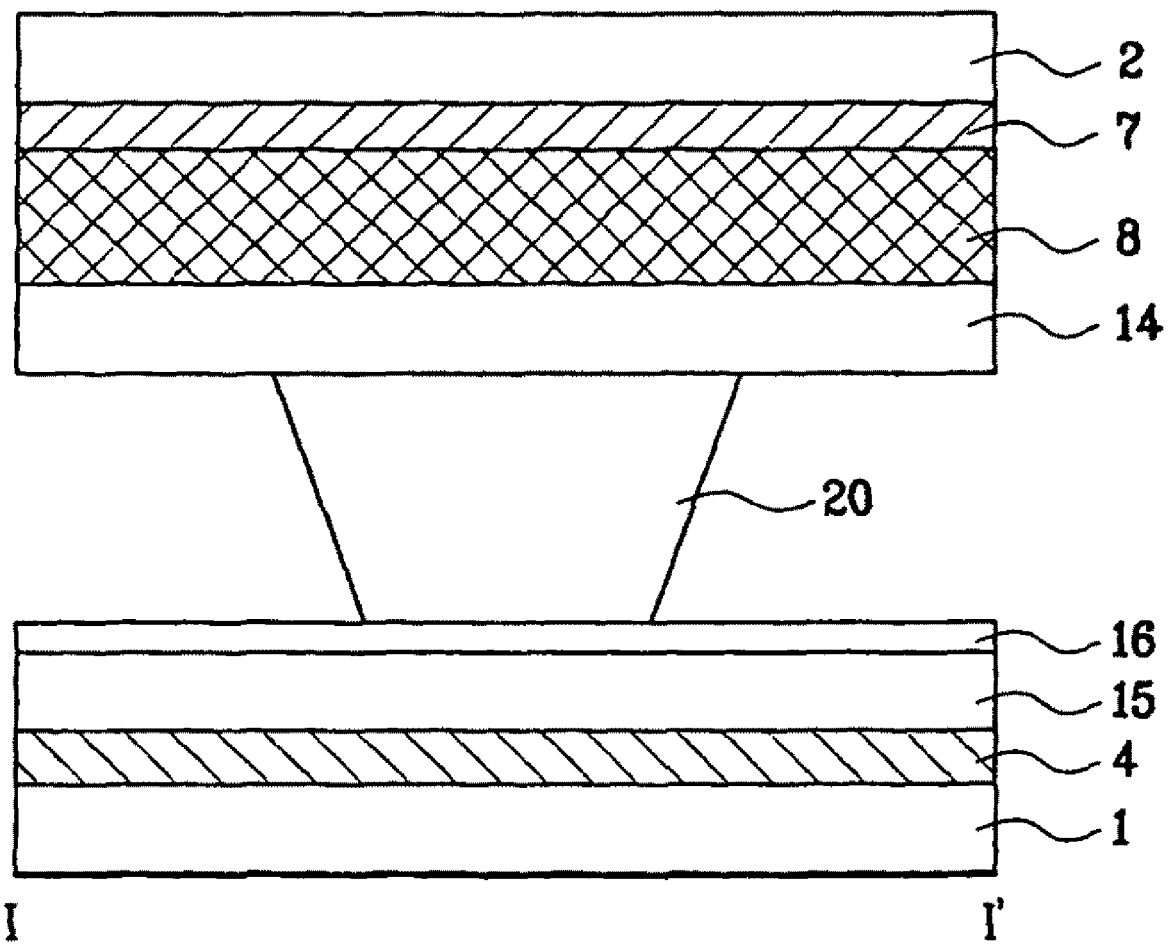
FIG. 5 is a cross-sectional view along I-I' of FIG. 4.
Figure 6A:
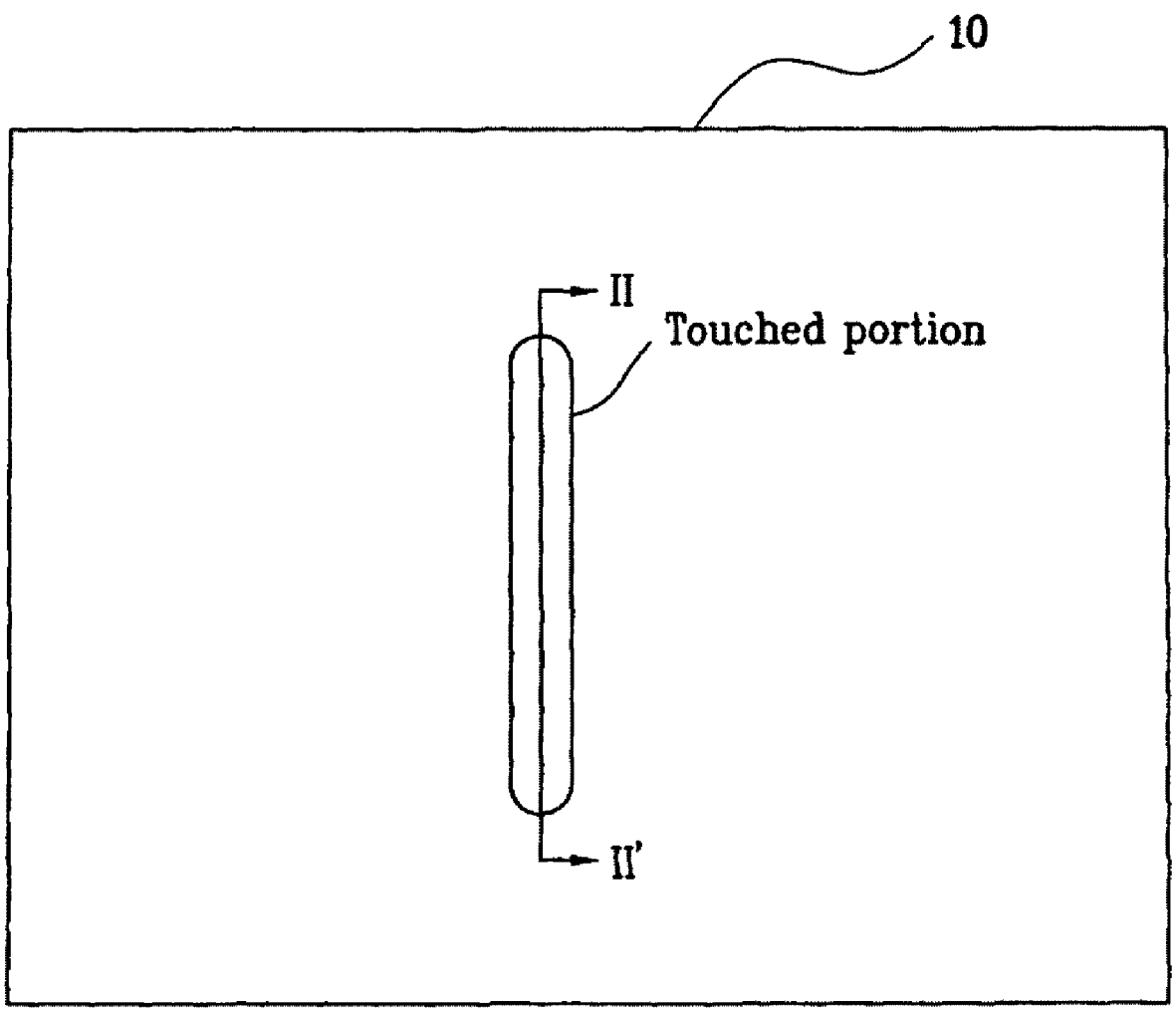
FIG. 6A and FIG. 6B are respectively a plane view and a cross-sectional view of showing spots generated on a screen by touching an LCD panel.
Figure 6B:
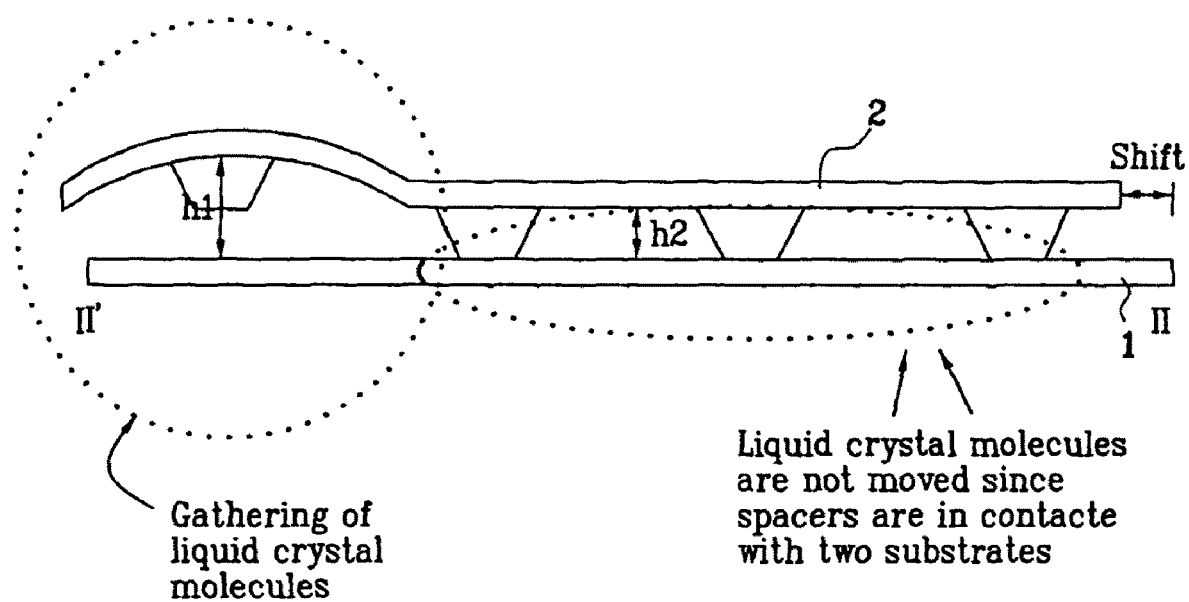
Figure 7:
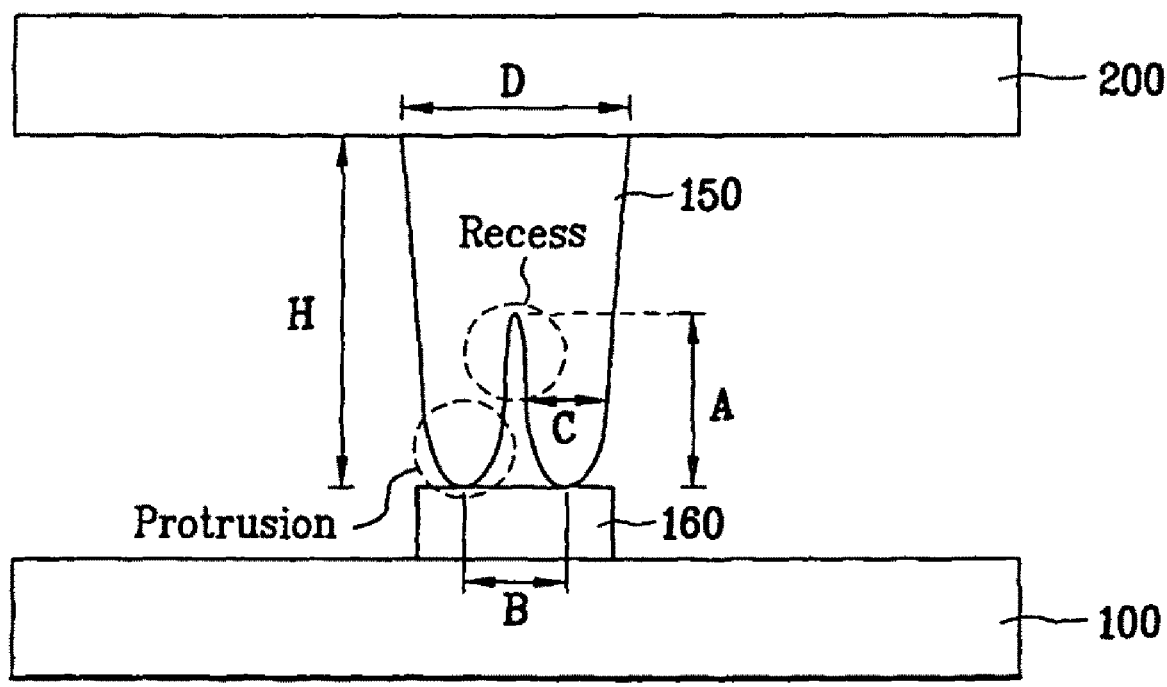
FIG. 7 is a cross-sectional view of an exemplary column spacer in an LCD device according to an embodiment of the present invention.

FIG. 7 is a cross-sectional view of an exemplary column spacer in an LCD device according to an embodiment of the present invention. Referring to FIG. 7, the LCD device includes a thin film transistor (TFT) array substrate 100, a color filter array substrate 200, a step difference part 160, and a column spacer 150. The step difference part 160 is formed on an inner surface of the TFT array 100. The step difference part 160 may be formed of a thin film transistor TFT or a protruding pattern on the TFT array substrate 100.

The column spacer 150 is formed on an inner surface of the color filter array substrate 200. Thus, the column spacer 150 contacts the inner surface of the color filter substrate 200 by a base surface. The column spacer 150 contacts the step difference part 160 by a protruding contact surface. In one embodiment of the present invention, as depicted in FIG. 7, the protruding contact surface of the column spacer 150 is provided with two protrusions and one recess. In other embodiments of the present invention, the protruding contact surface of column spacer 150 may be provided with a plurality of protrusions and a plurality of recesses. Thus, the protruding contact surface of the column spacer is provided with a plurality of protrusions, and one or more recesses.

The base surface of the column spacer 150 with the color filter array substrate 200 may have various shapes. For example, the base surface may have the shape of a regular quadrilateral, such as a rectangle. Generally, the base surface may have the shape of a polygon, such as a pentagon. The base surface may also have a circular shape.

The plurality of protrusions and recesses forms a regular pattern within the protruding contact surface of the column spacer 150 with the step difference part 160 of the TFT array substrate 100. Each column spacer 150 has a width D in the range of 15 μm to 40 μm, and a height H in the range of about 2 μm to 5 μm. Here, the height H of the column spacer 150 corresponds to a distance from the base surface on the inner surface of color filter array substrate 200 (upper surface of an overcoat layer or a common electrode) to a point in the protruding contact surface where one of the protrusions of the column spacer 150 contacts the step difference 160. A cross-section of one protrusion may have a maximum width C in the range of about 5 μm to 15 μm.

In one embodiment of the present invention, each of the plurality of recesses is provided between adjacent protrusions. In other embodiments of the present invention, a flat surface, rather than a recess, may be provided between adjacent protrusions. Alternatively, a flat surface, rather than a protrusion, may be provided between adjacent recesses.

In this embodiment of the present invention, the recess is formed between the protrusions. A depth of the recess, which is measured from the protruding contact surface of the protrusions with the step difference 160, has a value in the range between about 0.1 μm and the height of the column spacer 150. An interval B between the contact points of adjacent protrusions with the step difference depends on the number of protrusions and recesses formed on the column spacer 150.

In the LCD device according to an embodiment of the present invention, the column spacer 150 contacts the step difference part 160 of the TFT array substrate 100 within the protruding contact surface. The step difference part 160 may be provided with an additional protruding pattern on relatively high portions of the TFT array substrate 100, or at predetermined portions thereof. Here, the protruding pattern is formed of a semiconductor layer at a lower portion thereof, and source and drain electrodes at an upper portion thereof. The protruding patterns may be formed at fixed intervals on gate or data lines.

As discussed above, when the protruding contact surface between the column spacer 150 and the TFT array substrate 100 increases, spots caused by touching a screen surface of the LCD panel become serious. In the LCD device according to an embodiment of the present invention, it is possible to decrease the contact area between the column spacer 150 and the TFT array substrate 100. Thus, a frictional force between the column spacer 150 and the TFT array substrate 100 can be decreased. Moreover, in accordance with an embodiment of the present invention, it is possible to prevent a vacuum state between the column spacer 150 and the TFT array substrate 100. The column spacer 150 contacts with the TFT array substrate 100 through contact points. As a result, the spots caused by touching the LCD panel can be easily removed.

The column spacer 150 is formed on a black matrix layer (not shown) of the color filter array substrate 200. Specifically, when the step difference part 160 is formed of a thin film transistor, the column spacer 150 is formed on the black matrix layer corresponding to the thin film transistor. When the step difference part 160 is formed of a protruding pattern, the column spacer 150 is formed on the black matrix layer corresponding to the protruding pattern.

Figure 8A:
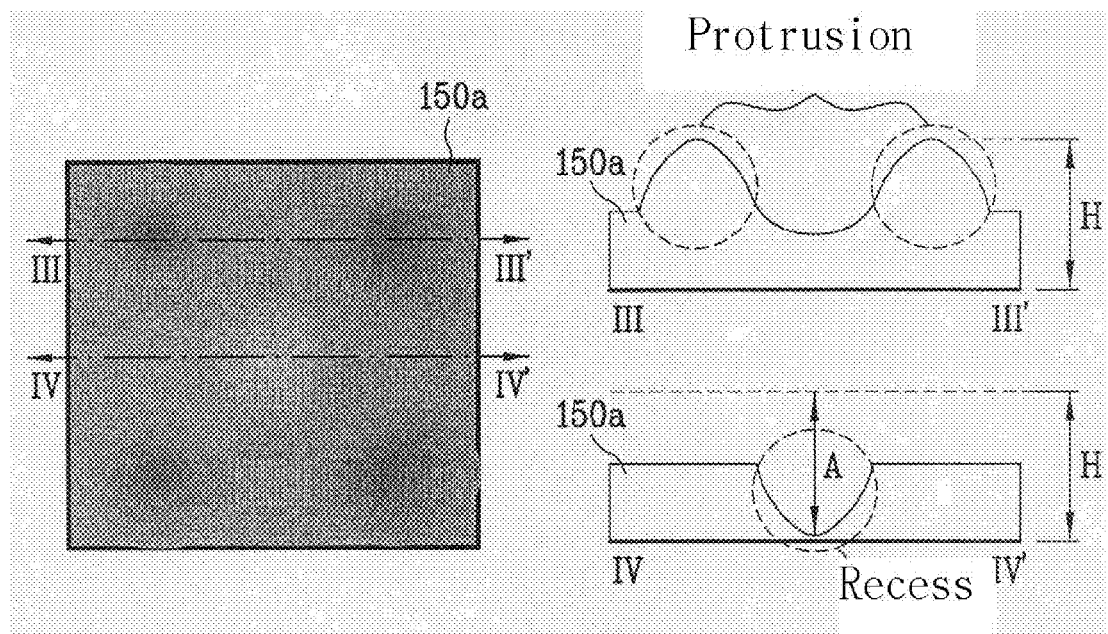
FIG. 8A shows a top view of an exemplary column spacer on a color filter array substrate, and corresponding cross-sectional views of a recess and a plurality of protrusions on a column spacer in accordance with an embodiment of the present invention.

FIG. 8A shows a top view of an exemplary column spacer on a color filter array substrate, and representative cross-sectional views of a recess and a plurality of protrusions on a column spacer in accordance with an embodiment of the present invention. The cross-sectional views are taken along sections III-III' and IV-IV' of the column spacer 150a, respectively. Referring to FIG. 8A, a column spacer 150a is formed on the color filter array substrate 200. In this embodiment of the present invention, the base surface of the column spacer 150a with the color filter array substrate 200 is shaped as a regular quadrilateral having four equal sides.

The column spacer 150a has four protrusions corresponding to the four corners of the base surface. In addition, the column spacer 150a has a recess corresponding to the center of the base surface. In this embodiment of the present invention, an area between the protrusions or adjacent to the recess has a flat surface.

Herein, a distance from the flat surface to a peak of the protrusion is in the range from about 0.1 µm to 3.5 µm, and a distance from the flat surface to a bottom of the recess is in the range from about 0.1 µm to 3.5 µm. Also, the depth A from the peak of the protrusion to the bottom of the recess is in the range from about 0.2 µm to the height H of the column spacer 150a. The height H of the column spacer 150a depends on a cell gap of the LCD panel, which is in the range of about 2 µm to 5 µm.

Figure 8B:
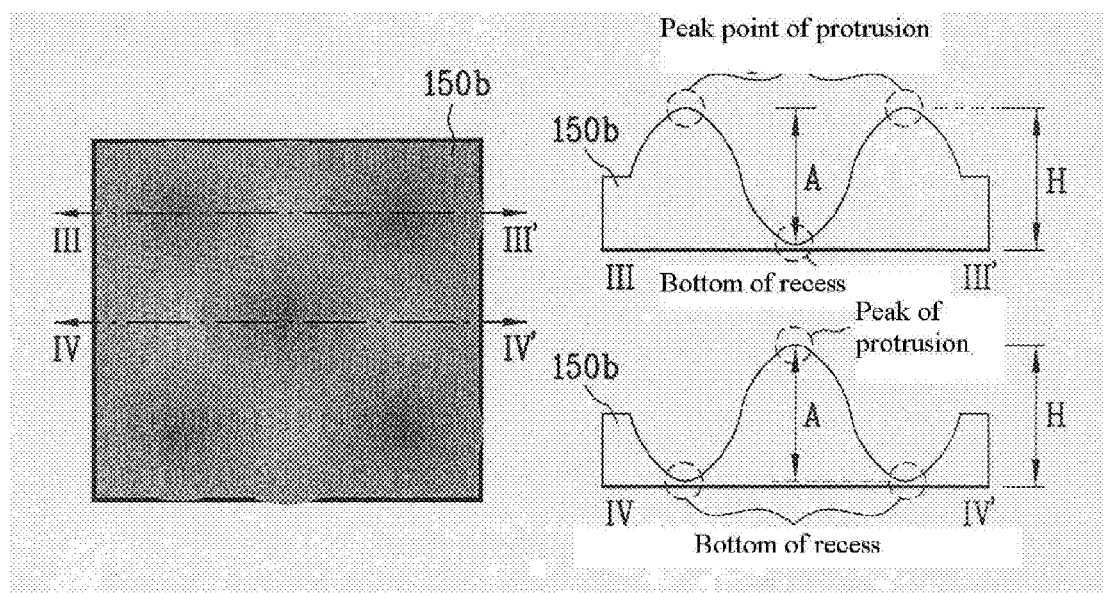
FIG. 8B shows a top view of an exemplary column spacer on a color filter array substrate, and corresponding cross-sectional views of a plurality of recesses and a plurality of protrusions on the column spacer in accordance with another embodiment of the present invention.

FIG. 8B shows a top view of an exemplary column spacer on a color filter array substrate, and representative cross-sectional views of a plurality of recesses and a plurality of protrusions on the column spacer in accordance with another embodiment of the present invention. The cross-sectional views are taken along sections III-III' and IV-IV' of the column spacer 150b, respectively. Referring to FIG. 8B, a column spacer 150b is formed on the color filter array substrate 200. In this embodiment of the present invention, the base surface of the column spacer 150b with the color filter array substrate 200 is shaped as a regular quadrilateral having four equal sides.

The column spacer 150b includes four protrusions corresponding to the four corners of the base surface, and an additional protrusion provided at the center of the base surface. A recess is provided between each of the protrusions. The protrusions are formed in direct lateral contact with the recesses. Thus, there is no flat surface between the protrusions and the recesses. As depicted in the top view from FIG. 8B, the alternating protrusions and recesses form an uneven surface on the protruding contact surface of the column spacer 150b. Herein, the depth A from the peak of one of the protrusions to the bottom of one of the recesses is in the range from about 0.1 µm and a height H of the column spacer 150b. The height H of the column spacer 150b is in the range of about 2 µm to 5 µm.

Figure 8C:
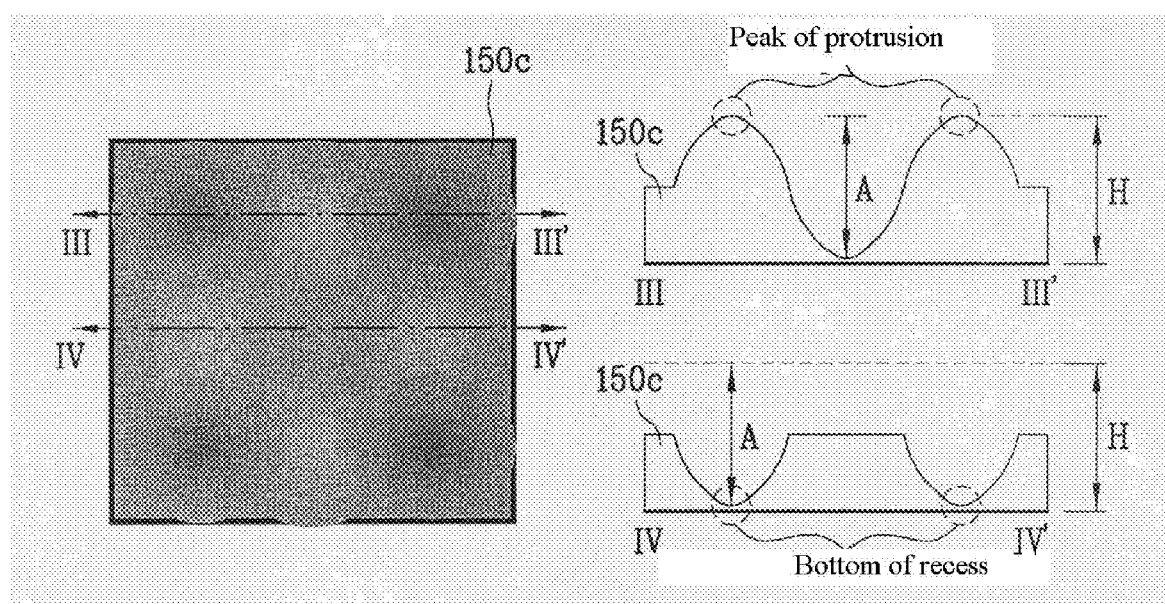
FIG. 8C shows a top view of an exemplary column spacer on a color filter array substrate, and corresponding cross-sectional views of a plurality of recesses and a plurality of protrusions on the column spacer in accordance with another embodiment of the present invention.

FIG. 8C shows a top view of an exemplary column spacer on a color filter array substrate, and representative cross-sectional views of a plurality of recesses and a plurality of protrusions on the column spacer in accordance with another embodiment of the present invention. The cross-sectional views are taken along sections III-III' and IV-IV' of the column spacer 150c, respectively. Referring to FIG. 8C, a column spacer 150c is formed on the color filter array substrate 200. In this embodiment of the present invention, the base surface of the column spacer 150c with the color filter array substrate 200 is shaped as a regular quadrilateral having four equal sides.

The column spacer 150c has four protrusions corresponding to the four corners of the base surface. A recess is formed between each pair of the protrusions. A flat surface having a regular quadrilateral shape is formed at the center of the base surface. Unlike the column spacer 150b of FIG. 8B, the flat surface in FIG. 8C is positioned between the recesses. Thus, the column spacer 150c has a relatively smooth pattern at the center thereof.

The depth A from a peak of the protrusion to the bottom of the recess is in the range between about 0.2 µm and a height H of the column spacer 150c. The distance from the bottom of the recess to the flat surface is in the range between about 0.1 µm and 3.5 am. Also, the height H of the column spacer 150c is in the range of about 2 µm to 5 µm.

In embodiments of the present invention as depicted in FIGS. 8A to 8C, the protrusions and recesses on the column spacers 150a, 150b and 150c are similar in size. However, the protrusion can be made larger than the recess. Alternatively, the recess can be made larger than the protrusion. Moreover, the number of protrusions and recesses on the column spacer can be changed. Hereinafter, exemplary column spacers will be described, which include protrusions with various cross-sectional widths and at different distances between each other.

Figure 9A:
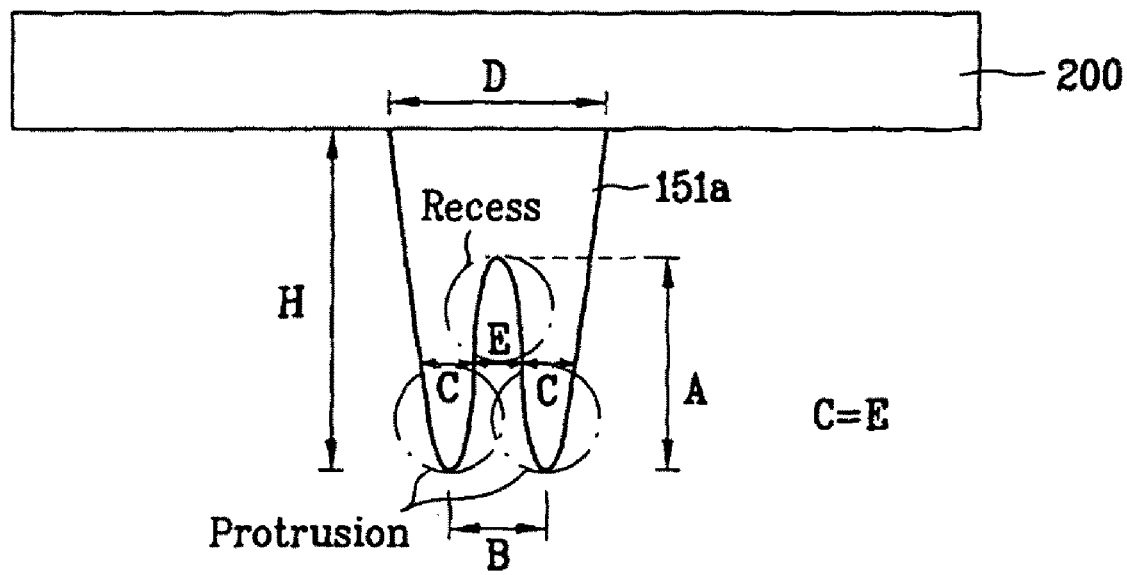
FIG. 9A is a cross-sectional view of an exemplary column spacer on a color filter array substrate of an LCD device according to an embodiment of the present invention.

FIG. 9A is a cross-sectional view of an exemplary column spacer on a color filter array substrate of an LCD device according to an embodiment of the present invention. Referring to FIG. 9A, a column spacer 151a is formed on the color filter array substrate 200. The column spacer 151a includes protrusions and recesses. In this embodiment of the present invention, the protrusions and recesses are similar in size. In particular, the cross-section dimension C of a protrusion is identical to the cross-section dimension E of a recess. Accordingly, an interval B between the peaks of adjacent protrusions is twice the cross-section dimension C of a protrusion (B≈2C). A depth A from a peak of the protrusion to a bottom of the recess is in the range from about 0.1 µm to a height H of the column spacer 151a.

The width D of the column spacer 151a depends on the shape of the base surface of the column spacer 151a with the color filter array substrate 200. In an embodiment of the present invention, the base surface of the column spacer 151a has the shape of a regular quadrilateral having four sides of the same length. In this case, the width of the column spacer 151a corresponds to one side of the quadrilateral, which is the shape of the base surface of the column spacer 151a. The column spacer 151a includes a portion with an uneven-surface due to the protrusions of the column spacer 151a. The portion with the uneven-surface has a depth A from the peak of a protrusion to the bottom of a recess.

Figure 9B:
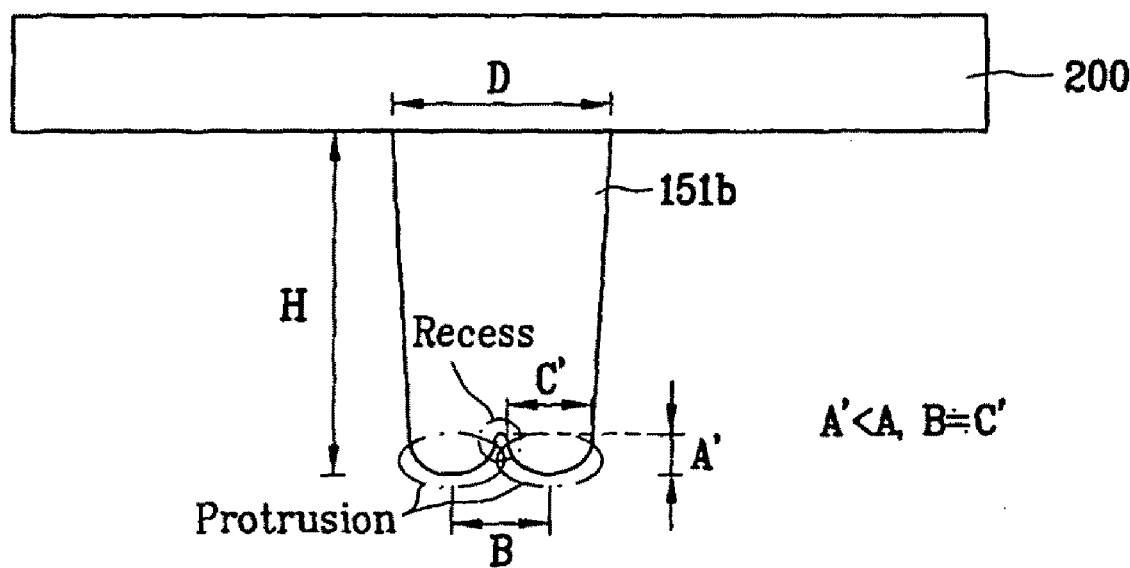
FIG. 9B is a cross-sectional view of an exemplary column spacer on a color filter array substrate of an LCD device according to another embodiment of the present invention.

FIG. 9B is a cross-sectional view of an exemplary column spacer on a color filter array substrate of an LCD device according to another embodiment of the present invention. Referring to FIG. 9B, a column spacer 151b is formed on the color filter array substrate 200. The column spacer 151b includes protrusions and recesses. In this embodiment of the present invention, the column spacer 151b has relatively small recesses and relatively large protrusions. Accordingly, a cross-section dimension of the recess, which is the maximum width of the recess, is close to '0.' An interval B between the peaks of adjacent protrusions is close to the cross-section dimension C' of the protrusions. As shown in FIG. 9B, the protrusion is larger than the recess, and a depth A' from a peak of the protrusion to a bottom of the recess is relatively small in comparison with the depth A of the column spacer 151a shown in FIG. 9A (A'<A).

Figure 9C:
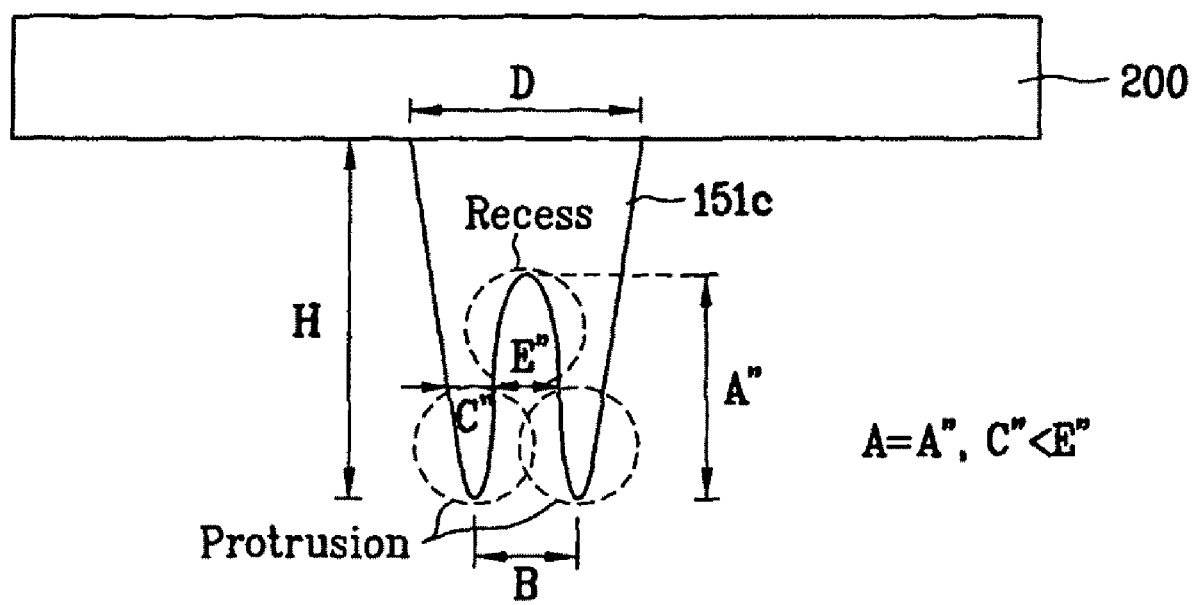
FIG. 9C is a cross-sectional view of an exemplary column spacer on a color filter array substrate of an LCD device according to another embodiment of the present invention.

FIG. 9C is a cross-sectional view of an exemplary column spacer on a color filter array substrate of an LCD device according to another embodiment of the present invention. Referring to FIG. 9C, a column spacer 151c is formed on the color filter array substrate 200. The column spacer 151c includes protrusions and recesses. In comparison with the column spacer of FIG. 9A, the column spacer 151c of FIG. 9C has a relatively small protrusion and a relatively large recess. Accordingly, the cross-section dimension C" of the protrusion is smaller than the cross-section dimension E" of the recess. Similarly to FIG. 9A, a depth A" from the peak of the protrusion to the bottom of the recess is in the range between about 0.1 μm and a height H of the column spacer 151c.

The protruding contact surface of the column spacer 151c, which includes the protrusions and recesses, contacts the step difference part 160 of the TFT array substrate 100 (shown in FIG. 7). Specifically, the peaks of the protrusions contact the step difference part 160 of the TFT array substrate 100 (shown in FIG. 7). If the column spacer 151c is pressed against the substrate by an external force, such as bonding, the protrusions including the peaks are pressed more against the step difference part 160. As a result, the contact area of the column spacer 151c with the TFT array substrate 100 corresponds to the peaks or the surrounding portions of the peaks.

According to embodiments of the present invention, the peaks of the protrusions are in contact with the TFT array substrate. Thus, the column spacer has a relatively small contact area with the TFT array substrate. Accordingly, during the bonding process, the pressure generated by the applied external force is larger in comparison to the pressure generated by the same external force on a larger contact area. Accordingly, when the column spacer is being pressed, the protrusions of the column spacer, being in contact with the step difference part 160, are subjected to a higher pressure, in comparison with the related art. The pressure exerted by the column spacer prevents gravity defect when thermal expansion of liquid crystal at a high temperature makes it difficult to maintain a cell gap between the TFT array substrate 100 and the color filter array substrate 200.

Figure 10:
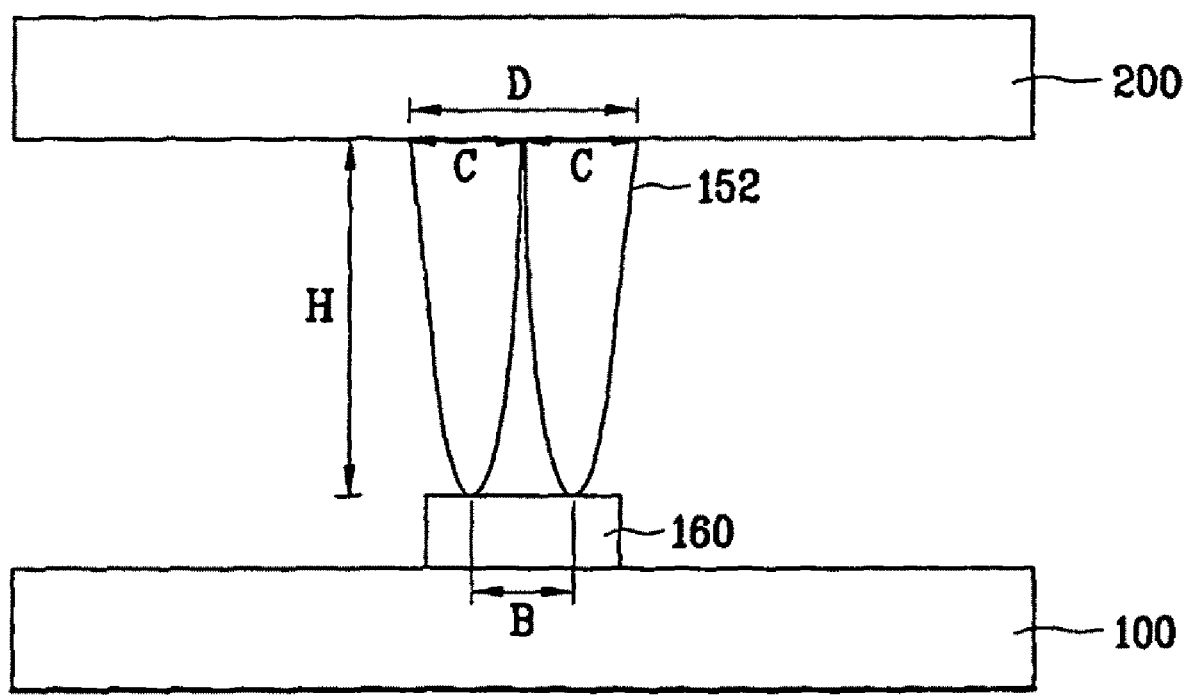
FIG. 10 is a cross-sectional view of an exemplary LCD device according to an embodiment of the present invention.

FIG. 10 is a cross-sectional view of an exemplary LCD device according to an embodiment of the present invention. As shown in FIG. 10, the LCD device includes a TFT array substrate 100, a color filter array substrate 200, a step difference part 160, and a column spacer 152. The step difference part 160 may be a thin film transistor or a protruding pattern on the TFT array substrate 100. The column spacer 152 is patterned on an inner surface of the color filter array substrate 200 facing the step difference part 160 of the TFT array substrate 100. Thus, the column spacer 152 contacts the inner surface of the color filter substrate 200 through a base surface. The column spacer 152 contacts the step difference part 160 through a protruding contact surface. The column spacer 152 is provided with a plurality of protrusions.

The column spacer 152 is formed within the base surface with the color filter array substrate 200. The base surface may be shaped as a regular quadrilateral, such as a rectangle. The base surface may also be a polygon, such as a pentagon, or a circle. If the column spacer 152 is formed within a rectangular area of the color filter array 200, a width D of the column spacer 152 corresponds to a length or a width of the rectangle. If the column spacer 152 is formed within a circular area of the color filter array 200, a diameter of the circle corresponds to the width D of the column spacer 152.

In an embodiment of the present invention, one protrusion may be formed in direct lateral contact with an adjacent protrusion as shown in the drawings. Alternatively, one protrusion may be formed at a distance from the adjacent protrusion. In the latter case, when forming one protrusion at a specified distance from the adjacent protrusion, a portion of the surface of the color filter array substrate between the two adjacent protrusions, is externally exposed.

An interval B between peaks of two adjacent protrusions depends on the width D of the column spacer 152, the number of protrusions on one column spacer 152, or a cross-section dimension C of the protrusion. For example, as depicted in FIG. 10, if the column spacer includes two protrusions, has a width D of about 20 μm, and the protrusions are directly adjacent, the interval B between the two peaks of the adjacent protrusions corresponds to the cross-section dimension C of the protrusion, about 10 μm. The width D of one column spacer 152 is about 15 μm to 40 nm, and the height H of the column spacer 152, from a surface (interior surface of overcoat layer or common electrode) of the color filter array substrate 200 to the peak of the protrusion, is about 2 μm to 5 μm.

According to an embodiment of the present invention, the column spacer 152 of LCD device includes a plurality of protrusions. As discussed above, when pressure is applied through the base surface to the column spacer 152, the peaks of the protrusions, or the area surrounding the peaks of the protrusions, are pressed against the step difference part 160 of the TFT array substrate 100.

In the LCD device according to an embodiment of the present invention, the protruding contact surface of the column spacer 152 contacts the step difference part 160 of the TFT array substrate 100. Like the thin film transistor for driving a pixel electrode in each pixel region, the step difference part 160 may have an additional protruding pattern on relatively high portions or specific portions of the TFT array substrate 100. Herein, the protruding pattern is formed of a semiconductor layer at a lower portion thereof, and source and drain electrodes at an upper portion thereof. Also, the protruding patterns may be formed at fixed intervals on a plurality of gate lines.

Figure 11:
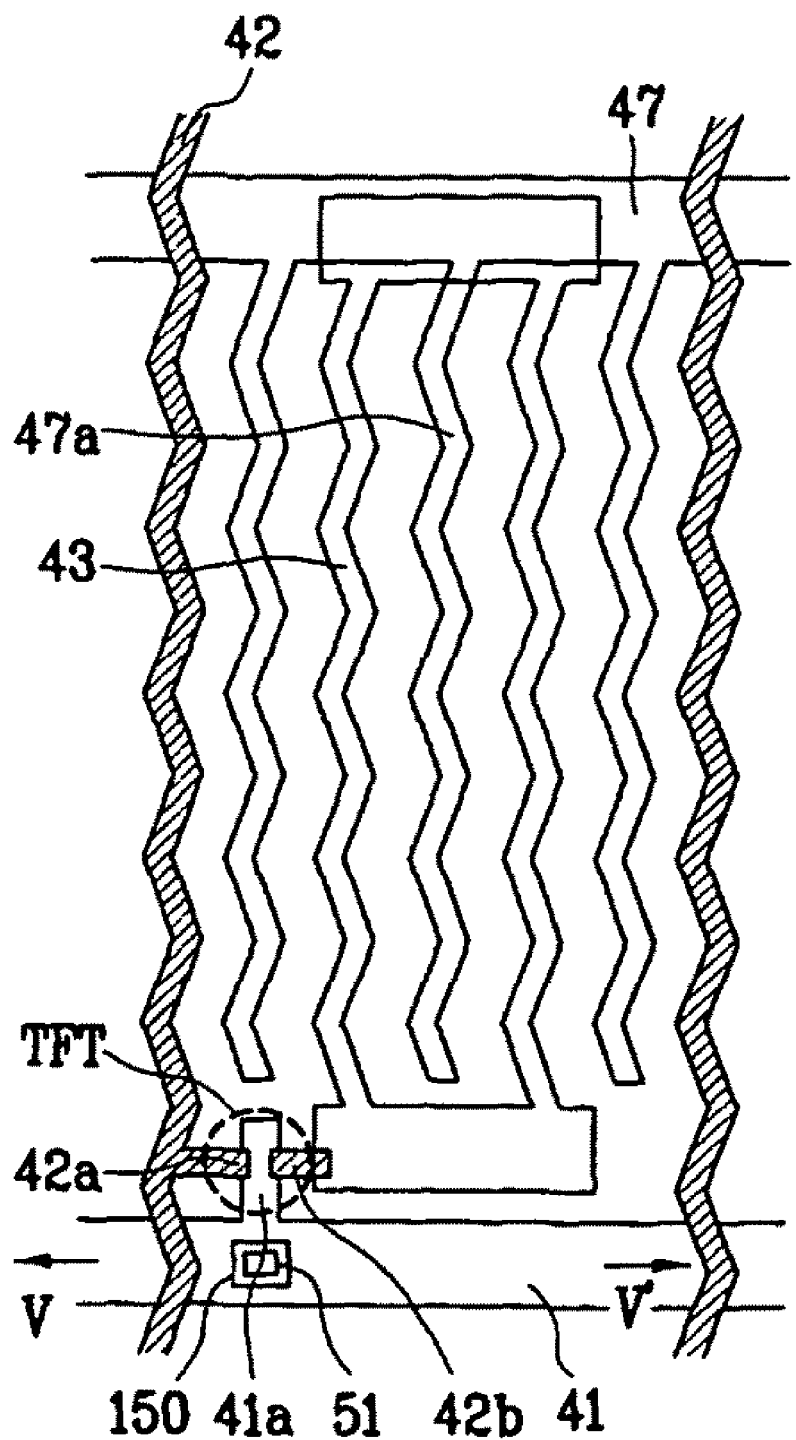
FIG. 11 is a plane view of an exemplary IPS mode LCD device according to an embodiment of the present invention.
Figure 12:
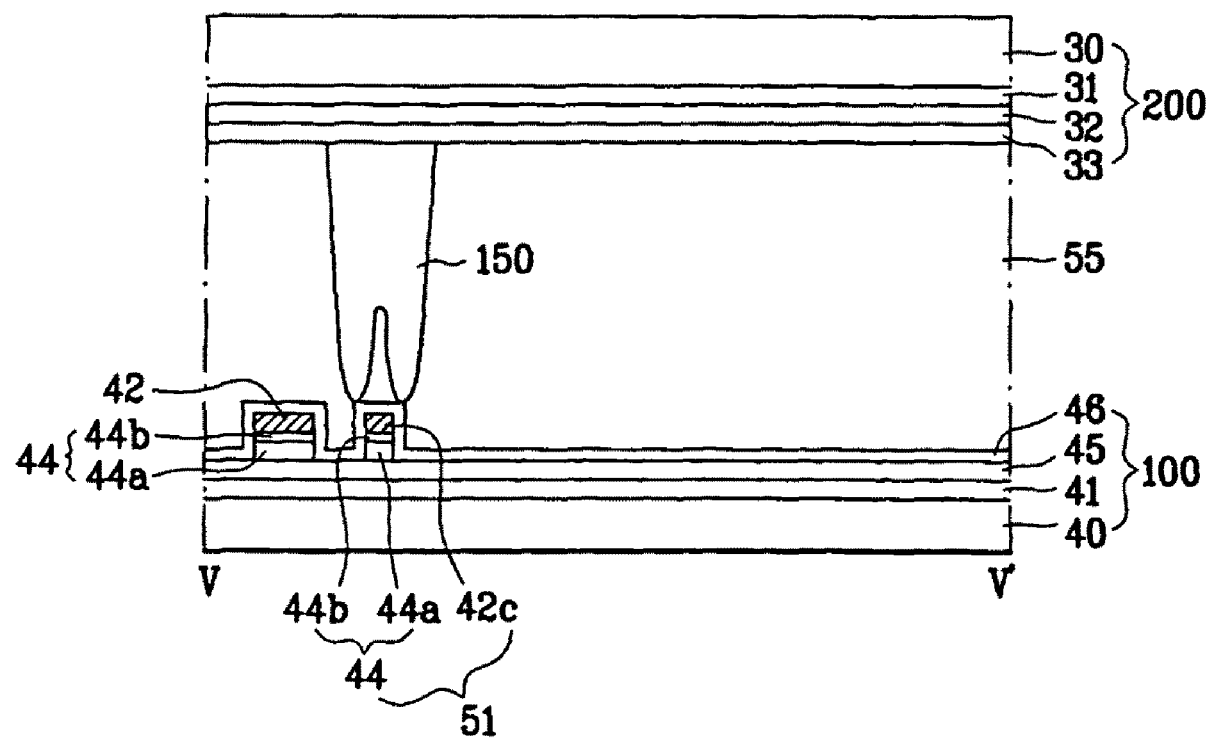
FIG. 12 is a cross-sectional view along line V-V' of FIG. 11 showing an exemplary column spacer facing a protruding pattern according to an embodiment of the present invention.

FIG. 11 is a plane view of an exemplary IPS mode LCD device according to an embodiment of the present invention. FIG. 12 is a cross-sectional view along line V-V' of FIG. 11 showing an exemplary column spacer facing a protruding pattern according to an embodiment of the present invention. The LCD device operates in an In-Plane Switching (IPS) mode i.e., the applied electric field is in parallel to the TFT array substrate and the color filter array substrate. A step difference part of the TFT array substrate includes a protruding pattern 51. A column spacer 150 is formed facing the protruding pattern 51.

Referring to FIG. 11 and FIG. 12, the LCD device includes a TFT array substrate 100, a color filter array substrate 200, a column spacer 150, and a liquid crystal layer 55. A protruding pattern 51 is formed in a portion of a gate line 41 on the TFT array substrate 100. The color filter array substrate 200 is formed facing the TFT array substrate 100. The column spacer 150 is formed facing the protruding pattern 51 of the TFT array substrate 100. The column spacer 150 includes a plurality of protrusions and/or recesses. The liquid crystal layer 55 is formed between the TFT array substrate 100 and the color filter array substrate 200.

The TFT array substrate 100 includes the gate line 41, a data line 42, a thin film transistor TFT, the protruding pattern 51, a common electrode 47a, a pixel electrode 43, a common line 47, and a storage electrode. The gate line 41 crosses perpendicularly the data line 42, to define a pixel region. The thin film transistor TFT is formed at a crossing point of the gate line 41 and the data line 42. The protruding pattern 51 is formed at the same position on the gate line 41 in every sub-pixel.

The common electrode 47a and the pixel electrode 43 are alternately formed in a zigzag pattern within the pixel region. The common line 47 is formed in parallel to the gate line 41 across the pixel region. The common line 47 is connected with the common electrode 47a. The storage electrode partially overlaps the common line 47 within the pixel region. The storage electrode extends from the pixel electrode 43. The data line 42 is formed parallel to the common electrode 47a and the pixel electrode 43 in a zigzag pattern.

The thin film transistor TFT includes a gate electrode 41a, a source electrode 42a, a drain electrode 42b, and a semiconductor layer 44. The gate electrode 41a protrudes from the gate line 41. The source electrode 42a and the drain electrode 42b are formed at a specified interval from each other. The source electrode 42a and the drain electrode 42b overlap both sides of the gate electrode 41a. Thus, a channel is formed in an area between the source electrode 42a and the drain electrode 42b. Then, the semiconductor layer 44 is formed below metal layers of the data line, the source electrode, and the drain electrode.

The semiconductor layer 44 is formed by sequentially depositing an amorphous silicon layer 44a and an n-type layer 44b. The n-type layer 44b is removed in the portion corresponding to the channel. Thereafter, a gate insulating layer 45 is formed on the entire surface of the TFT array substrate 100 below the semiconductor layer 44. The gate insulating layer 45 covers the gate line 41 and the gate electrode 41a. A passivation layer 46 is interposed between the drain electrode 42b and the pixel electrode 43. The drain electrode 42b contacts the pixel electrode 43 through a hole in the passivation layer 46.

The protruding pattern 51 is formed at the same position in each sub-pixel of the TFT array substrate 100. The protruding pattern 51 is formed above the gate line 41. The protruding pattern 51 includes the semiconductor layer 44, which includes sequentially the amorphous silicon layer 44a and the n-type layer 44b, at a lower portion thereof. The protruding pattern 51 also includes the source and drain electrodes 42c at an upper portion thereof.

The protruding pattern 51 is defined during the process of forming the data line 42. Also, since the gate insulating layer 45 is interposed between the gate line 41 and the protruding pattern 51, the gate line 41 is insulated from the protruding pattern 51. The common line 47 and the common electrode 47a extending from the common line 47 are formed during the process for forming the gate line 41. The pixel electrode 43 is formed on the passivation layer 46 including the hole.

The color filter array substrate 200 includes a black matrix layer 31, an R, G and B color filter layer 32, and an overcoat layer 33. The black matrix layer 31 is formed on the color filter array substrate 200 to shield the light in a corresponding non-pixel region i.e., the areas of the gate line, the data line, and the thin film transistor. The R, G and B color filter layer 32 is formed on the entire surface of the color filter array substrate 200 including the black matrix layer 31, in correspondence with each sub-pixel. The overcoat layer 33 is formed on the entire surface of the color filter array substrate 200, to planarize the entire surface of the color filter array substrate 200 including the R, G and B color filter layer 32.

The column spacer 150 is formed by coating a positive photosensitive resin, a negative photosensitive resin, or an organic insulating layer on the overcoat layer 33, and patterning the positive photosensitive resin, the negative photosensitive resin, or the organic insulating layer. Thereby, the plurality of protrusions and/or recesses is formed. As described above, after completing the alignment of the TFT array substrate 100 and the color filter array substrate 200, an alignment material is printed on outer surfaces of the TFT array substrate 100 and the color filter array substrate 200. Then, the alignment material is rubbed to form the alignment layers (not shown).

Figure 13:
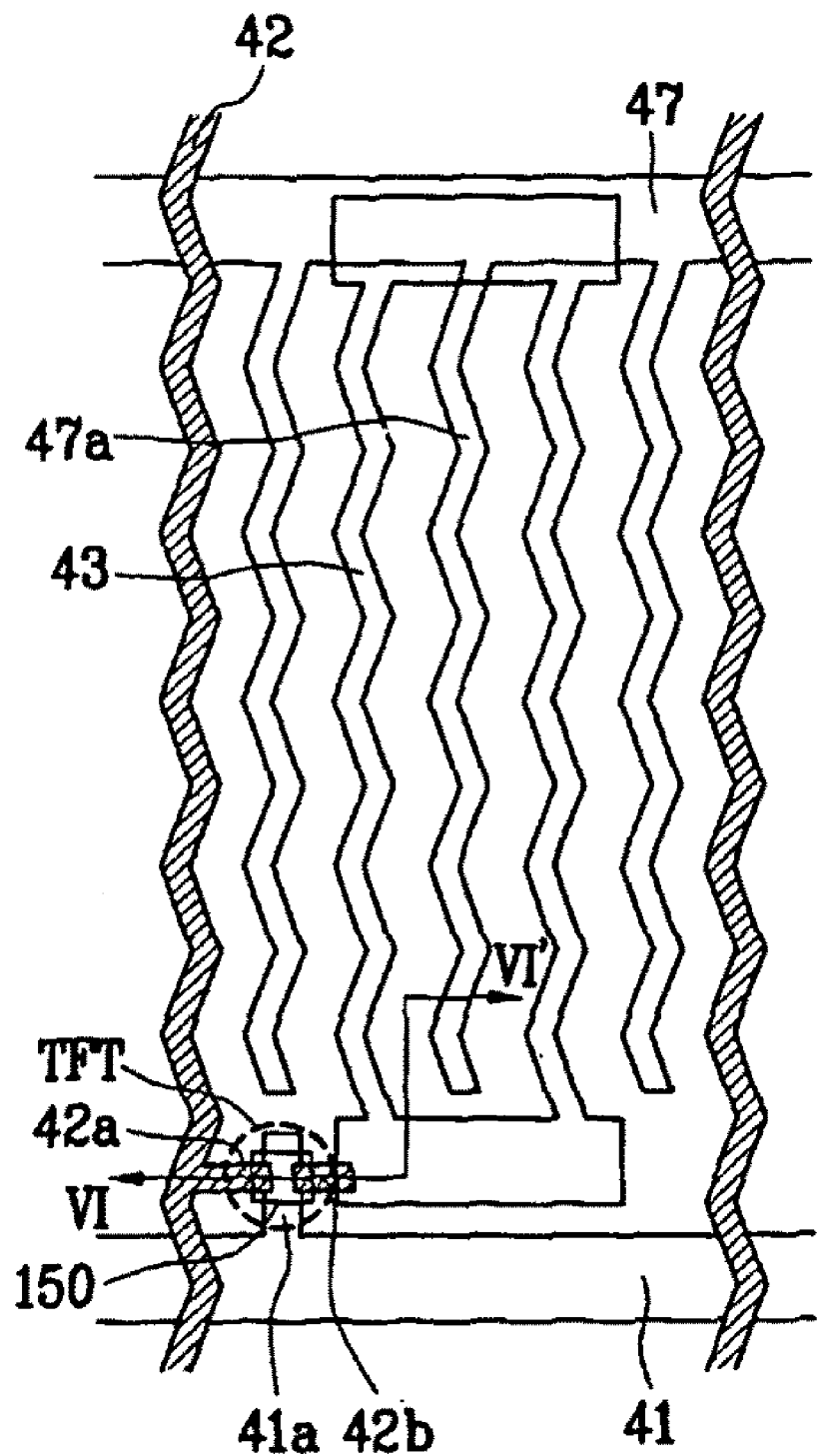
FIG. 13 is a plane view of an exemplary IPS mode LCD device according to another embodiment of the present invention.
Figure 14:
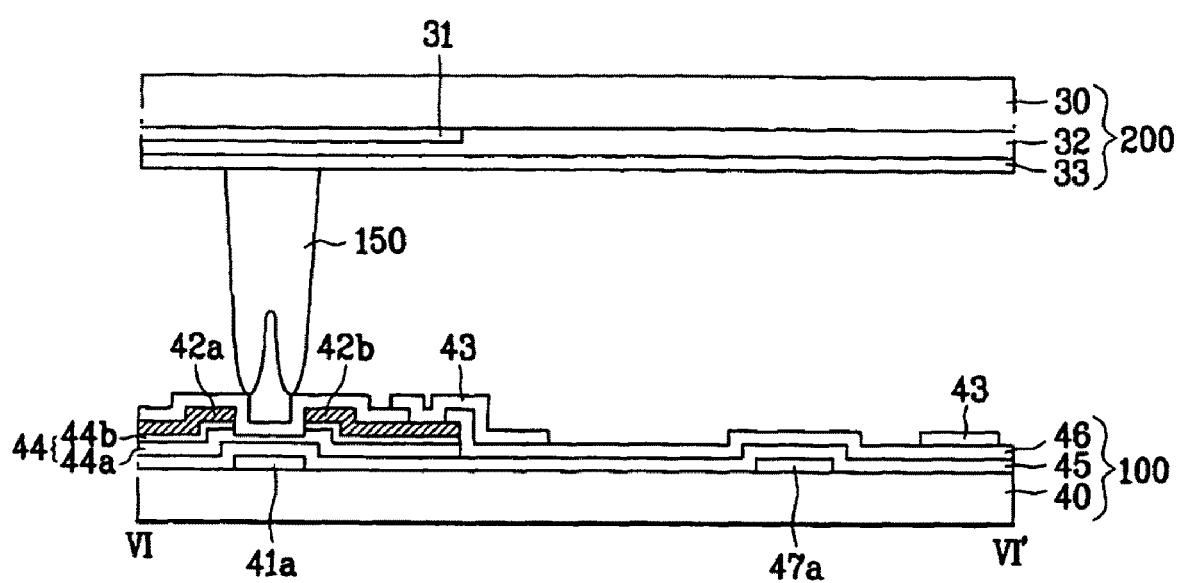
FIG. 14 is a cross-sectional view along line VI-VI' of FIG. 13 showing an exemplary column spacer facing a thin film transistor according to another embodiment of the present invention.

FIG. 13 is a plane view of an exemplary IPS mode LCD device according to another embodiment of the present invention. FIG. 14 is a cross-sectional view along line VI-VI' of FIG. 13 showing an exemplary column spacer facing a thin film transistor according to another embodiment of the present invention. In the exemplary IPS mode LCD device of FIG. 13 and FIG. 14, a step difference part is formed of a thin film transistor TFT rather than an additional protruding pattern. A column spacer 150 is formed facing the step difference part of the thin film transistor TFT.

As shown in FIG. 13 and FIG. 14, the LCD device includes a TFT array substrate 100, a color filter array substrate 200, a column spacer 150, and a liquid crystal layer 55. The TFT array substrate 100 includes the thin film transistor TFT. The color filter array substrate 200 is formed facing the TFT array substrate 100. The column spacer 150 is formed on the color filter array substrate 200 to face the thin film transistor TFT of the TFT array substrate 100. The column spacer 150 has a plurality of protrusions and/or recesses. Then, the liquid crystal layer 55 is formed between the TFT array substrate 100 and the color filter array substrate 200.

The TFT array substrate 100 includes a gate line 41, a data line 42, the thin film transistor TFT, a common electrode 47a, a pixel electrode 43, a common line 47, and a storage electrode. The gate line 41 crosses perpendicularly the data line 42, to define a pixel region. The thin film transistor TFT is formed at a crossing of the gate line 41 and the data line 42. The common electrode 47a and the pixel electrode 43 are alternately formed in a zigzag pattern within the pixel region. Then, the common line 47 is formed in parallel to the gate line 41 across the pixel region. The common line 47 is connected to the common electrode 47a. The storage electrode partially overlaps the common line 47 within the pixel region. The storage electrode extends from the pixel electrode 43. The data line 42 is formed parallel to the common electrode 47a and the pixel electrode 43 in the zigzag pattern.

The thin film transistor TFT includes a gate electrode 41a, a source electrode 42a, a drain electrode 42b, and a semiconductor layer 44. The gate electrode 41a protrudes from the gate line 41. Also, the source electrode 42a and the drain electrode 42b are formed at a specified interval from each other. The source electrode 42a and the drain electrode 42b overlap both sides of the gate electrode 41a. A channel is formed in an area between the source electrode 42a and the drain electrode 42b. Then, the semiconductor layer 44 is formed below metal layers of the data line, the source electrode, and the drain electrode.

The semiconductor layer 44 is formed by sequentially depositing an amorphous silicon layer 44a and an n-type layer 44b. The n-type layer 44b is removed in the portion corresponding to the channel. After that, a gate insulating layer 45 is formed on the entire surface of the TFT array substrate 100 below the semiconductor layer 44, to cover the gate line 41 and the gate electrode 41a, and a passivation layer 46 is interposed between the drain electrode 42b and the pixel electrode 43. The drain electrode 42b contacts the pixel electrode 43 through a hole in the passivation layer 46. Then, the common line 47 and the common electrode 47a extending from the common line 47 are simultaneously deposited during the process of forming the gate line 41. Also, the pixel electrode 43 is formed on the passivation layer 46 including the hole.

The color filter array substrate 200 includes a black matrix layer 31, an R, G and B color filter layer 32, and an overcoat layer 33. At this time, the black matrix layer 31 is formed on the color filter array substrate 200 in correspondence with a non-pixel region i.e., the areas of the gate line, the data line, and the thin film transistor TFT, to shield the light. Also, the R, G and B color filter layer 32 is formed on the entire surface of the color filter array substrate 200 including the black matrix layer 31, in correspondence with each sub-pixel. Then, the overcoat layer 33 is formed on the entire surface of the color filter array substrate 200, to planarize the entire surface of the color filter array substrate 200 including the R, G and B color filter layer 32.

The column spacer 150 is formed by coating a positive photosensitive resin, a negative photosensitive resin, or an organic insulating layer on the overcoat layer 33, and then patterning the positive photosensitive resin, the negative photosensitive resin, or the organic insulating layer on the overcoat layer 33. Thereby, the plurality of protrusions and/or recesses is formed. As described above, after completing the alignment of the TFT array substrate 100 and the color filter array substrate 200, an alignment material is printed on outer surfaces of the TFT array substrate 100 and the color filter array substrate 200. Then, the alignment material is rubbed, thereby forming the alignment layers (not shown).

Figure 15:
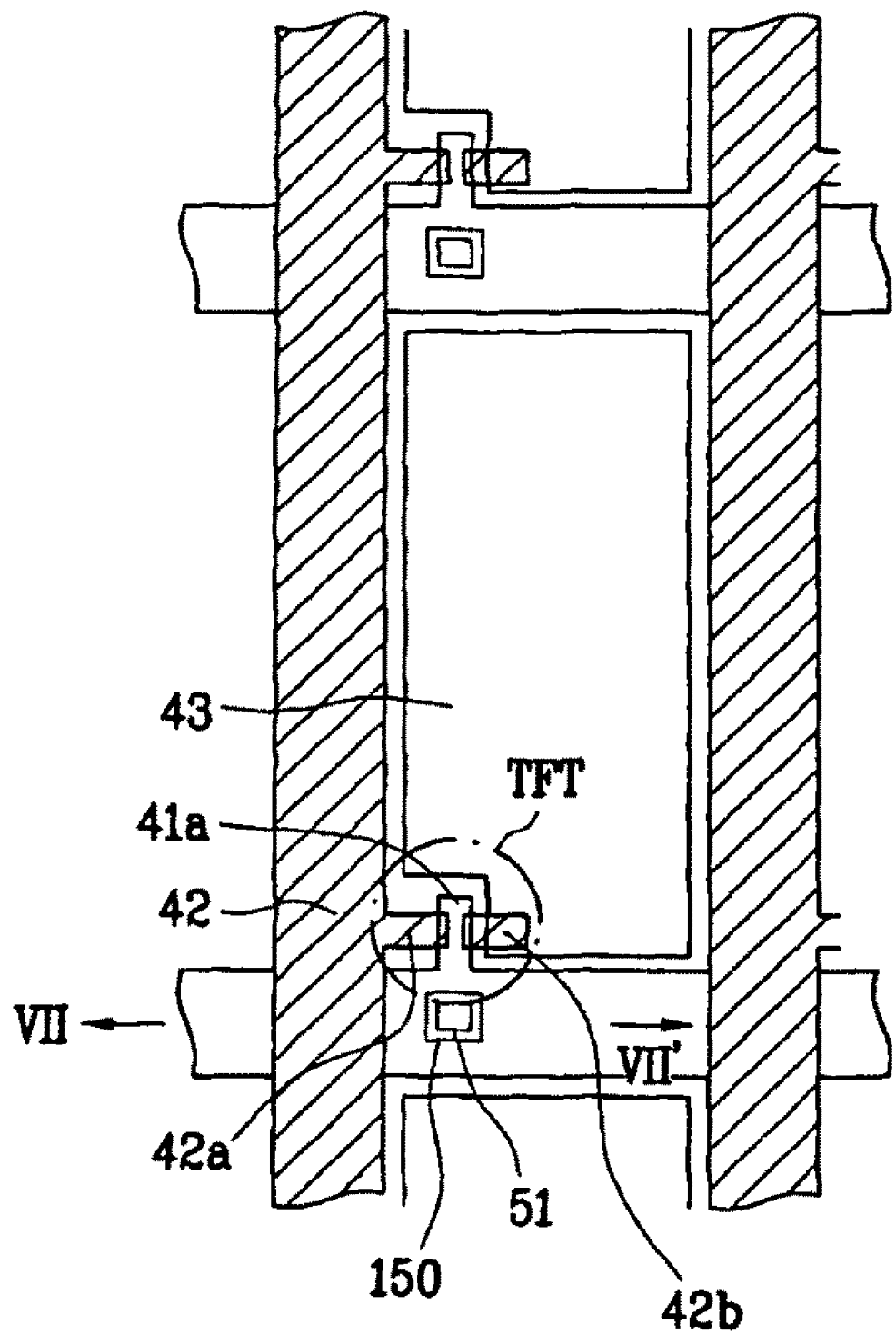
FIG. 15 is a plane view of an exemplary TN mode LCD device according to another embodiment of the present invention.
Figure 16:
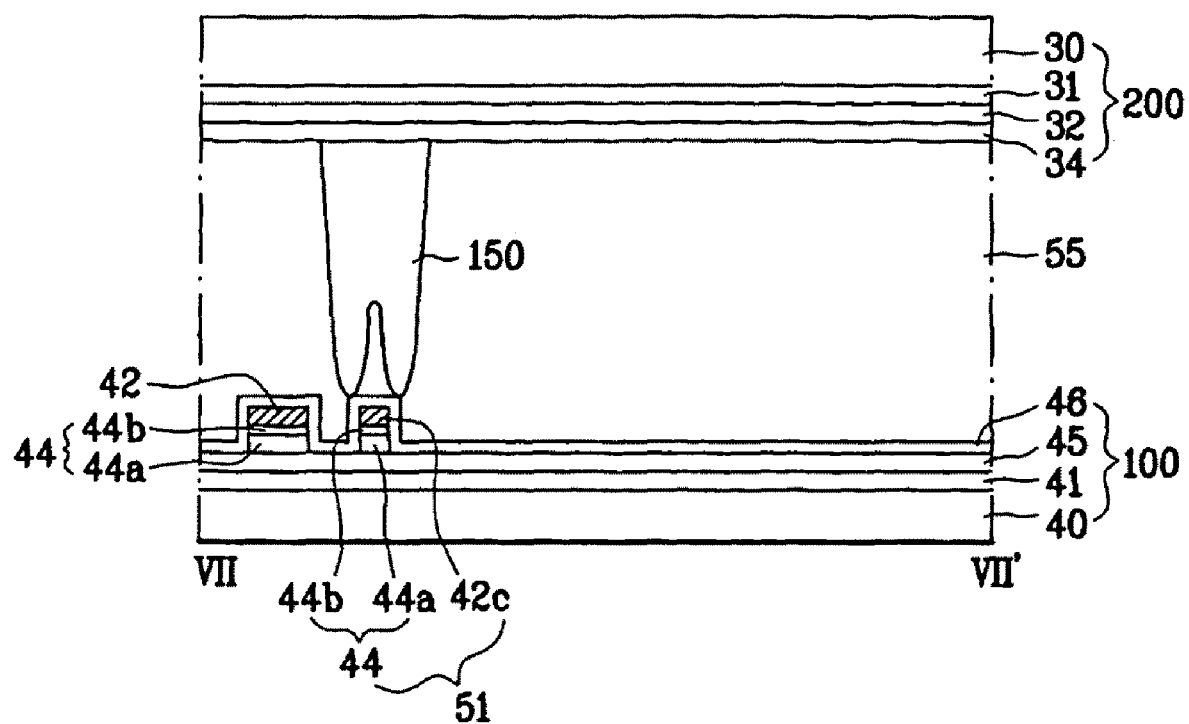
FIG. 16 is a cross-sectional view along line VII-VII' of FIG. 15 showing an exemplary column spacer facing a protruding pattern according to another embodiment of the present invention.

FIG. 15 is a plane view of an exemplary TN mode LCD device according to another embodiment of the present invention. FIG. 16 is a cross-sectional view along line VII-VII' of FIG. 15 showing an exemplary column spacer facing a protruding pattern according to another embodiment of the present invention. The exemplary LCD device of FIG. 15 and FIG. 16 operates in a TN mode (Twisted Nematic). In this embodiment of the present invention, a step difference part of the TFT array substrate 100 includes a protruding pattern 51. A column spacer 150 is formed facing the protruding pattern 51.

Referring to FIG. 15 and FIG. 16, the TN mode LCD device includes the TFT array substrate 100, a color filter array substrate 200, the column spacer 150, and a liquid crystal layer 55. The protruding pattern 51 is formed in a predetermined portion of a gate line 41 on the TFT array substrate 100. The color filter array substrate 200 faces the TFT array substrate 100. Then, the column spacer 150 having a plurality of protrusions and/or recesses is formed on the color filter array substrate 200. The column spacer 150 faces the protruding pattern 51 of the TFT array substrate 100. The liquid crystal layer 55 is formed between the TFT array substrate 100 and the color filter array substrate 200.

The TFT array substrate 100 includes the gate line 41, a data line 42, a thin film transistor TFT, the protruding pattern 51, and a pixel electrode 43. The gate line 41 crosses perpendicularly the data line 42 to define a pixel region. The thin film transistor TFT is formed at a crossing of the gate line 41 and the data line 42. The protruding pattern 51 is formed at the same position on the gate line 41 in every sub-pixel. Further, the pixel electrode 43 is formed in the pixel region.

The thin film transistor TFT includes a gate electrode 41a, a source electrode 42a, a drain electrode 42b, and a semiconductor layer 44. The gate electrode 41a protrudes from the gate line 41. The source electrode 42a and the drain electrode 42b are formed at a distance from each other. The source electrode 42a and the drain electrode 42b overlap both sides of the gate electrode 41a. A channel is formed in an area between the source electrode 42a and the drain electrode 42b. Then, the semiconductor layer 44 is formed below metal layers of the data line 42, the source electrode 42a, and the drain electrode 42b.

The semiconductor layer 44 is formed by sequentially depositing an amorphous silicon layer 44a and an n-type layer 44b. The n-type layer 44b is removed in the portion corresponding to the channel. Then, a gate insulating layer 45 is formed on the entire surface of the TFT array substrate 100 below the semiconductor layer 44 to cover the gate line 41 and the gate electrode 41a. A passivation layer 46 is interposed between the drain electrode 42b and the pixel electrode 43. The drain electrode 42b contacts the pixel electrode 43 through a hole in the passivation layer 46.

The protruding pattern 51 is formed at the same position in each sub-pixel of the TFT array substrate 100. The protruding pattern 51 is formed above the gate line 41. Also, the protruding pattern 51 is formed of the semiconductor layer 44, which includes sequentially the amorphous silicon layer 44a and the n-type layer 44b at a lower portion thereof, and the source and drain metal layers 42c at an upper portion thereof. The protruding pattern 51 is defined during the process of forming the data line 42. Also, since the gate insulating layer 45 is interposed between the gate line 41 and the protruding pattern 51, the gate line 41 is insulated from the protruding pattern 51. The passivation layer 46 is formed on the entire surface of the TFT array substrate 100 including the data line 42 and the protruding pattern 51.

The color filter array substrate 200 includes a black matrix layer 31, an R, G and B color filter layer 32, and a common electrode 34. The black matrix layer 31 is formed on the color filter array substrate 200 and faces a non-pixel region i.e., the areas of the gate line, the data line, and the thin film transistor. The black matrix layer 31 shields the non-pixel region from light. Also, the R, G and B color filter layer 32 is formed on the entire surface of the color filter array substrate 200 including the black matrix layer 31, in correspondence with each sub-pixel. The common electrode 34 is formed on the entire surface of the color filter array substrate 200 including the color filter layer 32.

The column spacer 150 is formed by coating a positive photosensitive resin, a negative photosensitive resin, or an organic insulating layer on the common electrode 34, and patterning the coated material. Thereby, the plurality of protrusions and/or recesses is formed. As described above, after completing the alignment of the TFT array substrate 100 and the color filter array substrate 200, an alignment material is printed on outer surfaces of the TFT array substrate 100 and the color filter array substrate 200. Then, the alignment material is rubbed, thereby forming the alignment layers (not shown).

Figure 17:
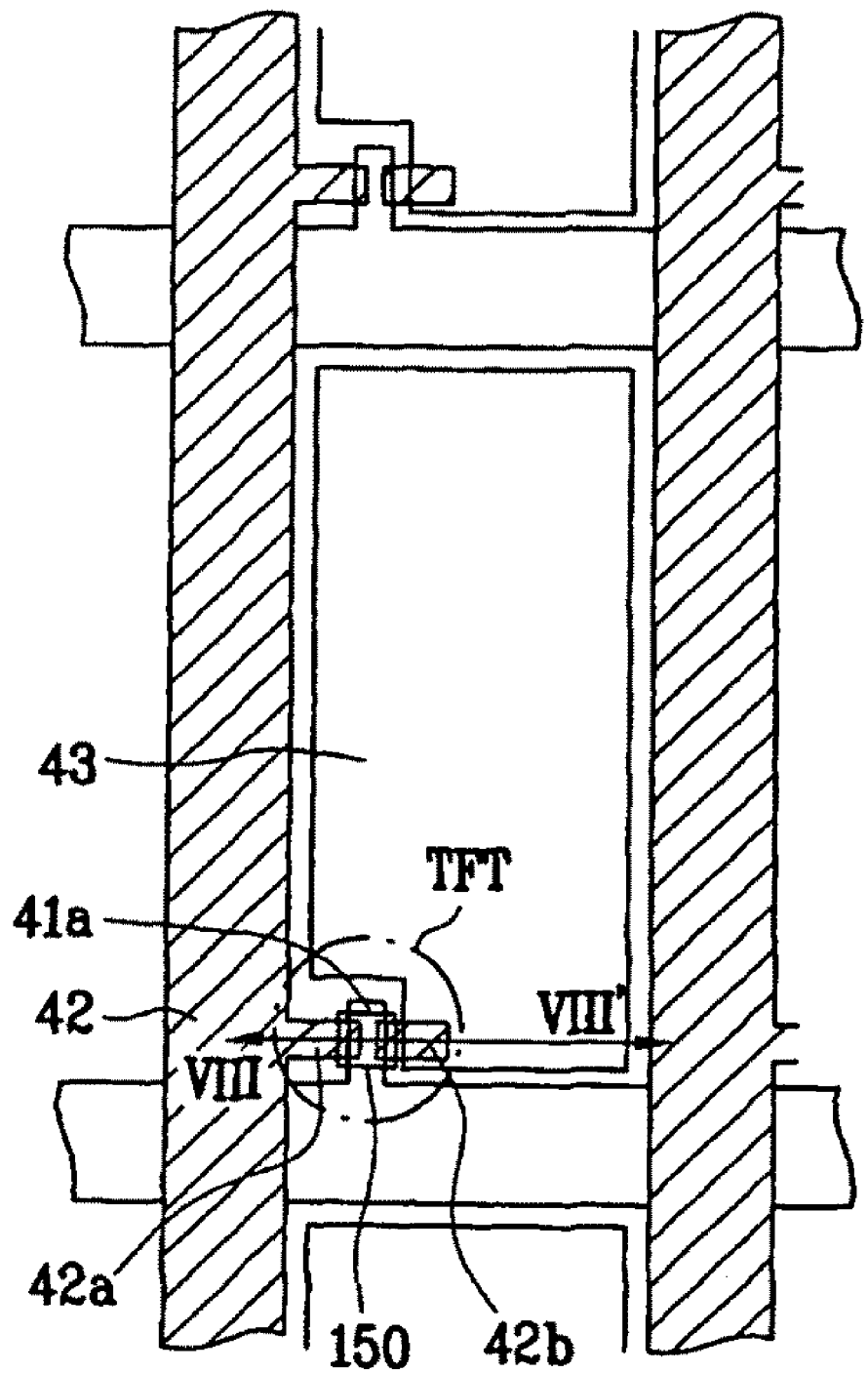
FIG. 17 is a plane view of an exemplary TN mode LCD device according to another embodiment of the present invention.
Figure 18:
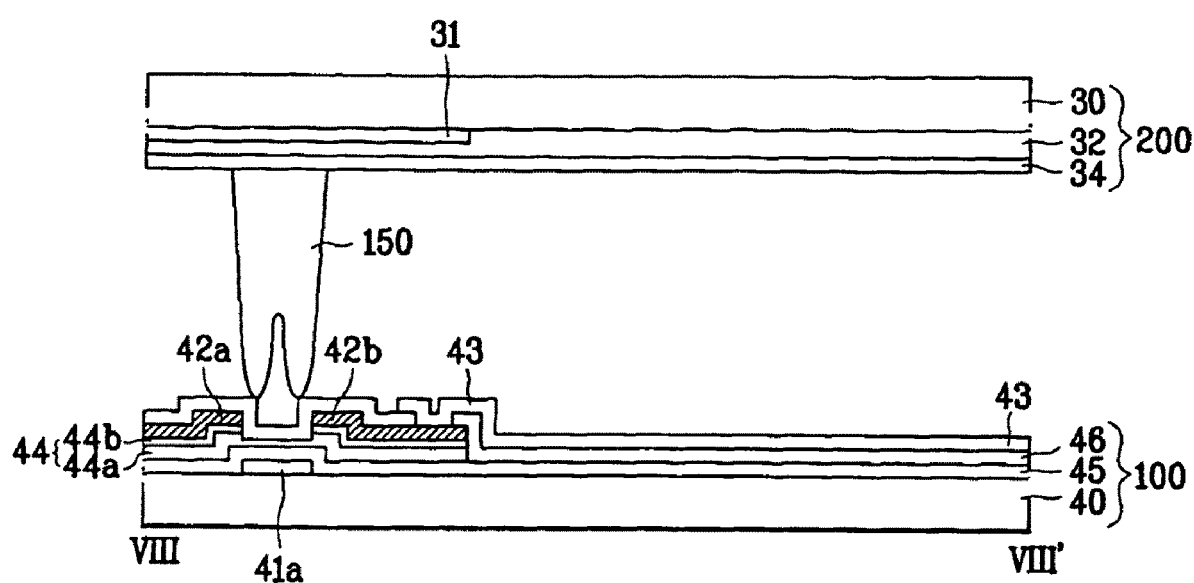
FIG. 18 is a cross-sectional view along line VIII-VIII' of FIG. 17 showing an exemplary column spacer facing a thin film transistor according to another embodiment of the present invention.

FIG. 17 is a plane view of an exemplary TN mode LCD device according to another embodiment of the present invention. FIG. 18 is a cross-sectional view along line VIII-VIII' of FIG. 17 showing an exemplary column spacer facing a thin film transistor according to another embodiment of the present invention. In the exemplary TN mode LCD device of FIG. 17 and FIG. 18, a step difference part is formed of a thin film transistor TFT rather than forming an additional protruding pattern 51. A column spacer 150 is formed facing the step difference part.

Referring to FIG. 17 and FIG. 18, the TN mode LCD device includes a TFT array substrate 100, a color filter array substrate 200, a column spacer 150, and a liquid crystal layer 55. The TFT array substrate 100 includes the thin film transistor TFT. The color filter array substrate 200 is formed facing the TFT array substrate 100. Also, the column spacer 150 is formed on the color filter array substrate 200 and faces the thin film transistor TFT of the TFT array substrate 100. The column spacer 150 has a plurality of protrusions and/or recesses. Then, the liquid crystal layer 55 is formed between the TFT array substrate 100 and the color filter array substrate 200.

The TFT array substrate 100 includes a gate line 41, a data line 42, the thin film transistor TFT, and a pixel electrode 43. The gate line 41 crosses perpendicularly the data line 42 to define a pixel region. The thin film transistor TFT is formed at a crossing of the gate line 41 and the data line 42. The pixel electrode 43 is formed in the pixel region.

The thin film transistor TFT includes a gate electrode 41a, a source electrode 42a, a drain electrode 42b, and a semiconductor layer 44. The gate electrode 41a protrudes from the gate line 41. Also, the source electrode 42a and the drain electrode 42b are spaced from each other. The source electrode 42a and the drain electrode 42b overlap with both sides of the gate electrode 41a. A channel is formed in an area between the source electrode 42a and the drain electrode 42b. Then, the semiconductor layer 44 is formed below metal layers of the data line 42, the source electrode 42a, and the drain electrode 42b.

The semiconductor layer 44 is formed by sequentially depositing an amorphous silicon layer 44a and an n-type layer 44b. The n-type layer 44b is removed in a portion corresponding to the channel. Then, a gate insulating layer 45 is formed on the entire surface of the TFT array substrate 100 below the semiconductor layer 44 to cover the gate line 41 and the gate electrode 41a. A passivation layer 46 is interposed between the drain electrode 42b and the pixel electrode 43. The drain electrode 42b contacts the pixel electrode 43 through a hole in the passivation layer 46. The pixel electrode 43 is formed on the passivation layer 46 including the hole.

The color filter array substrate 200 includes a black matrix layer 31, an R, G and B color filter layer 32, and a common electrode 34. The black matrix layer 31 is formed on the color filter array substrate 200 and faces a non-pixel region i.e., the areas of the gate line, the data line, and the thin film transistor. The black matrix layer 31 shields the non-pixel region from light. Also, the R, G and B color filter layer 32 is formed on the entire surface of the color filter array substrate 200 including the black matrix layer 31, in correspondence with each sub-pixel. Then, the common electrode 34 is formed on the entire surface of the color filter array substrate 200 including the color filter layer 32.

The column spacer 150 is formed by coating a positive photosensitive resin, a negative photosensitive resin, or an organic insulating layer on the common electrode 34, and patterning the coating. Thereby, the plurality of protrusions and/or recesses is formed. As described above, after completing the alignment of the TFT array substrate 100 and the color filter array substrate 200, an alignment material is printed on outer surfaces of the TFT array substrate 100 and the color filter array substrate 200. Then, the alignment material is rubbed, thereby forming the alignment layers (not shown).

Figure 19A:
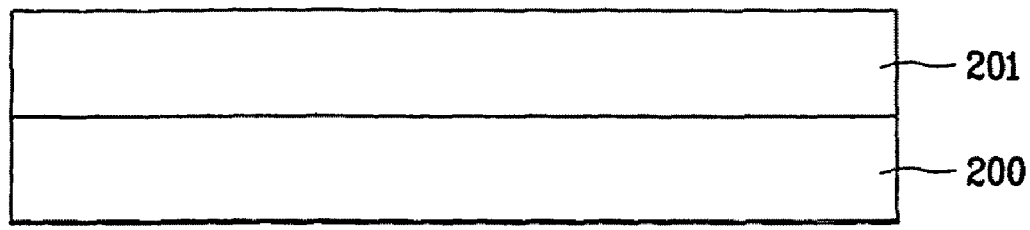
FIG. 19A is a cross-sectional view of a coating material on a color filter array substrate in a process for fabricating a column spacer of an LCD device according to an embodiment of the present invention.

FIG. 19A is a cross-sectional view of a coating material on a color filter array substrate in the process for fabricating a column spacer of an LCD device according to an embodiment of the present invention. Referring to FIG. 19A, a color filter array 200 is prepared. The color filter array substrate 200 includes the black matrix layer (not shown), the color filter layer (not shown), and the overcoat layer or the common electrode (not shown). Subsequently, a coating material 201, for example a positive photosensitive resin, is coated on the entire surface of the color filter array substrate 200.

Figure 19B:
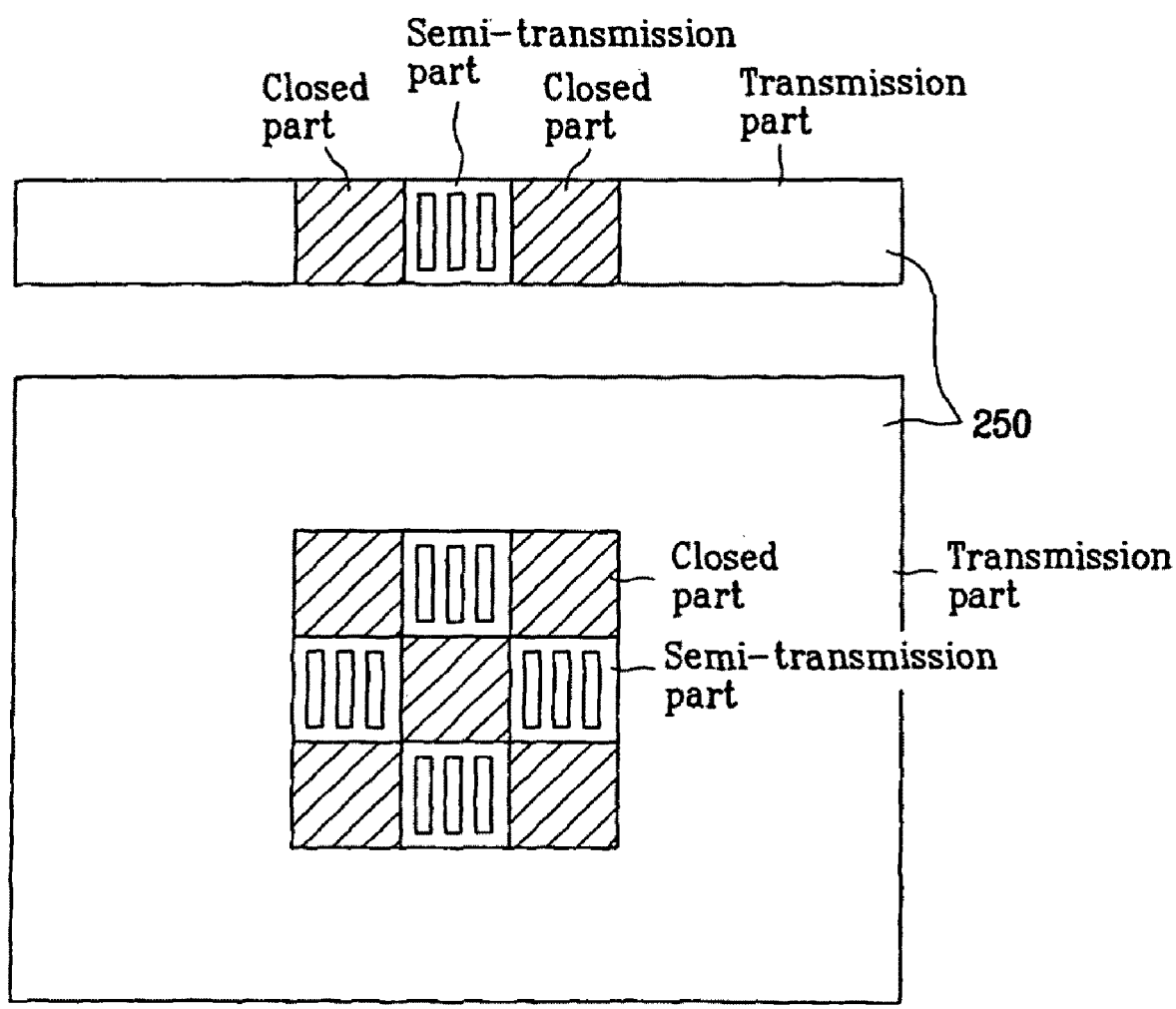
FIG. 19B is a schematic view of a mask for exposing portions of the color filter array substrate in the process for fabricating a column spacer of an LCD device according to an embodiment of the present invention.

FIG. 19B is a schematic view of a mask for exposing portions of the color filter array substrate in the process for fabricating a column spacer of an LCD device according to an embodiment of the present invention. Referring to FIG. 19B, a diffraction exposure mask 250 is prepared. The diffraction exposure mask 250 has a closed part, a semi-transmission part and a transmission part therein. The closed part and the semi-transmission part of the diffraction exposure mask 250 are alternately provided facing corresponding portions of the column spacer to be fabricated. The transmission part is provided in the remaining portion excluding the column spacer. In particular, the closed part of the diffraction exposure mask 250 corresponds to the protrusions on the column spacer, and the semi-transmission part of the diffraction exposure mask 250 corresponds to the recesses on the column spacer.

To form the diffraction exposure mask 250, a light-shielding material, such as chrome Cr, is deposited on portions of a quartz substrate corresponding to the closed part. A plurality of slits are formed on portions of the quartz substrate corresponding to the semi-transmission part. The remaining portions excluding the closed part and the semi-transmission part form the transmission part. Herein, the plurality of slits in the semi-transmission part can adjust light transmittance. For example, the amount of light passing through the semi-transmission part can be adjusted from 0% (no transmission) to 100% (total transmission of the incident light) according to the number of the slits and the interval between the slits.

A portion of the diffraction exposure mask 250 corresponding to the column spacer has the shape of a regular quadrilateral having four equal sides. The closed parts are provided at the four corners and at the center of the regular quadrilateral. Each semi-transmission part is provided between the closed parts in the regular quadrilateral. The remaining portions excluding the regular quadrilateral form the transmission part.

Figure 19C:
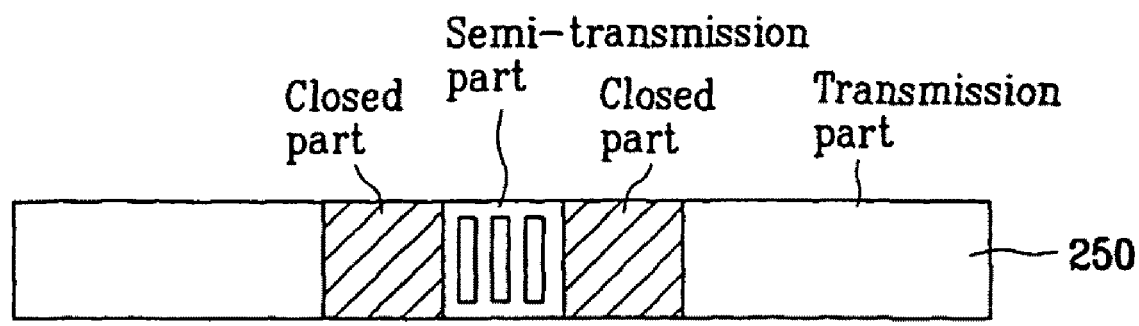
FIG. 19C is a cross-sectional view of an exposure step of the color filter array substrate in the process for fabricating a column spacer of an LCD device according to an embodiment of the present invention.

FIG. 19C is a cross-sectional view of an exposure step of the color filter array substrate in the process for fabricating a column spacer of an LCD device according to an embodiment of the present invention. Referring to FIG. 19C, the diffraction exposure mask 250 is provided above the color filter array substrate 200. Specifically, the diffraction exposure mask 250 is provided close to the positive photosensitive resin 201, at a specified distance thereof, for example about 200 μm. Then, the exposure process is performed. During the exposure process, it is important not to stain the diffraction exposure mask 250 with the positive photosensitive resin. The exposed portion of the positive photosensitive resin 201 corresponds to the transmission part of the exposure mask 250.

Figure 19D:
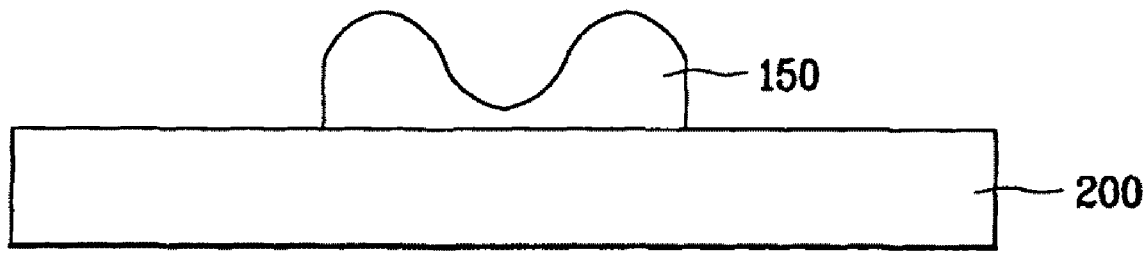
FIG. 19D is a cross-sectional view of an etching step of the color filter array substrate in the process for fabricating a column spacer of an LCD device according to an embodiment of the present invention.

FIG. 19D is a cross-sectional view of an etching step of the color filter array substrate in the process for fabricating a column spacer of an LCD device according to an embodiment of the present invention. Referring to FIG. 19D, after the exposure step, the positive photosensitive resin is developed using the diffraction exposure mask 250. An etchant is applied to the exposed portion of the positive photosensitive resin. Since the positive photosensitive resin has positive photoresist characteristics, the exposed portion is removed. The portion of the positive photosensitive resin corresponding to the closed part of the diffraction exposure mask remains. The portion corresponding to the semi-transmission part of the diffraction exposure mask is partially etched, thereby relatively thinner than the portion corresponding to the closed part of the diffraction exposure mask.

Subsequently, the color filter array substrate including the patterned positive photosensitive resin is baked. The surface of the positive photosensitive resin is patterned such that the step difference corresponds to each of the transmission part, the semi-transmission part and the closed part. Then, the surface of the remaining positive photosensitive resin is rounded, thereby forming the column spacer 150 having the plurality of protrusions and recesses.

In another embodiment of the aforementioned patterning process for forming the column spacer 150, a light-shielding material, such as chrome (Cr), is deposited on the transparent quartz substrate to form the closed part. Then, the column spacer 150 may be fabricated with a half-tone mask formed by depositing a half-tone material on the semi-transmission part to control the light transmittance.

Positive photosensitive resin may be used for the column spacer 150 because positive the photosensitive resin is more suitable than negative photosensitive resin to form the detailed pattern corresponding to the plurality of transmission, semi-transmission and closed parts. However, when forming large protrusions and recesses in the column spacer, the column spacer may be formed of the negative photosensitive resin.

Since the column spacer is formed by coating, exposing and developing the photosensitive resin, the fabrication process can be simplified. If the column spacer is formed of an insulating layer, it is necessary to deposit a photosensitive layer and etch the insulating layer. In contrast, if the column spacer is formed of a photosensitive resin, there is no requirement for depositing the photosensitive layer and etching the insulating layer, thereby simplifying fabrication process.

Figure 20:
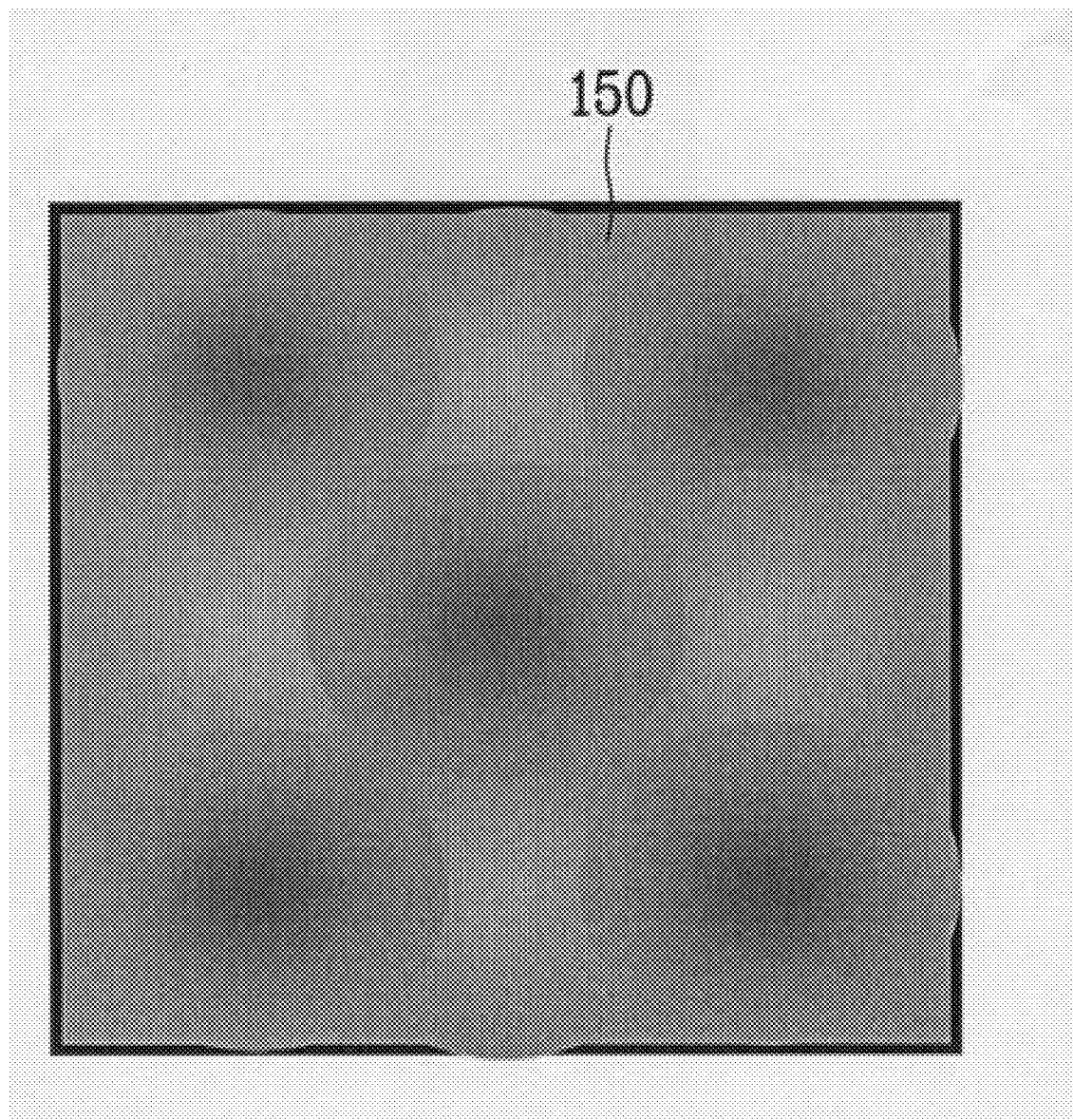
FIG. 20 is a top view of an exemplary column spacer according to an embodiment of the present invention.

FIG. 20 is a top view of an exemplary column spacer according to an embodiment of the present invention. Referring to FIG. 19D and FIG. 20, in the LCD device according to an embodiment of the present invention, the base surface of the column spacer with the color filter array substrate 200 is shaped as a regular quadrilateral. Also, the protruding contact surface of the column spacer with the TFT array substrate 100 includes the protrusions corresponding to the four corners and the center of the regular quadrilateral, and the recess between the protrusions.

Figure 21A:
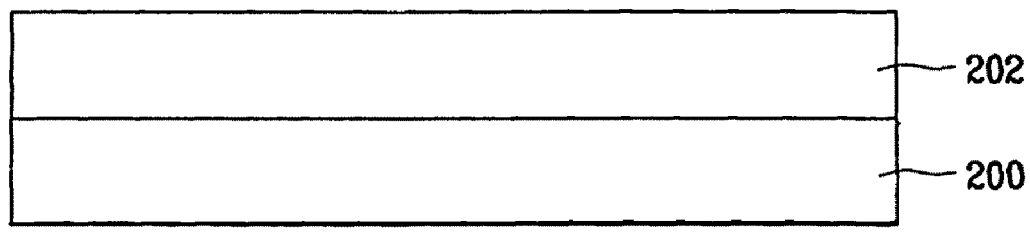
FIG. 21A is a cross-sectional view of a coating material on a color filter array substrate in a process for fabricating a column spacer of an LCD device according to another embodiment of the present invention.

FIG. 21A is a cross-sectional view of a coating material on a color filter array substrate in a process for fabricating a column spacer of an LCD device according to another embodiment of the present invention. Referring to FIG. 21A, a color filter array substrate 200 is prepared. The color filter array substrate 200 includes the black matrix layer (not shown), the color filter layer (not shown), and the overcoat layer or the common electrode (not shown). Subsequently, a coating material, for example a negative photosensitive resin 202, is coated on the entire surface of the color filter array substrate 200.

Figure 21B:
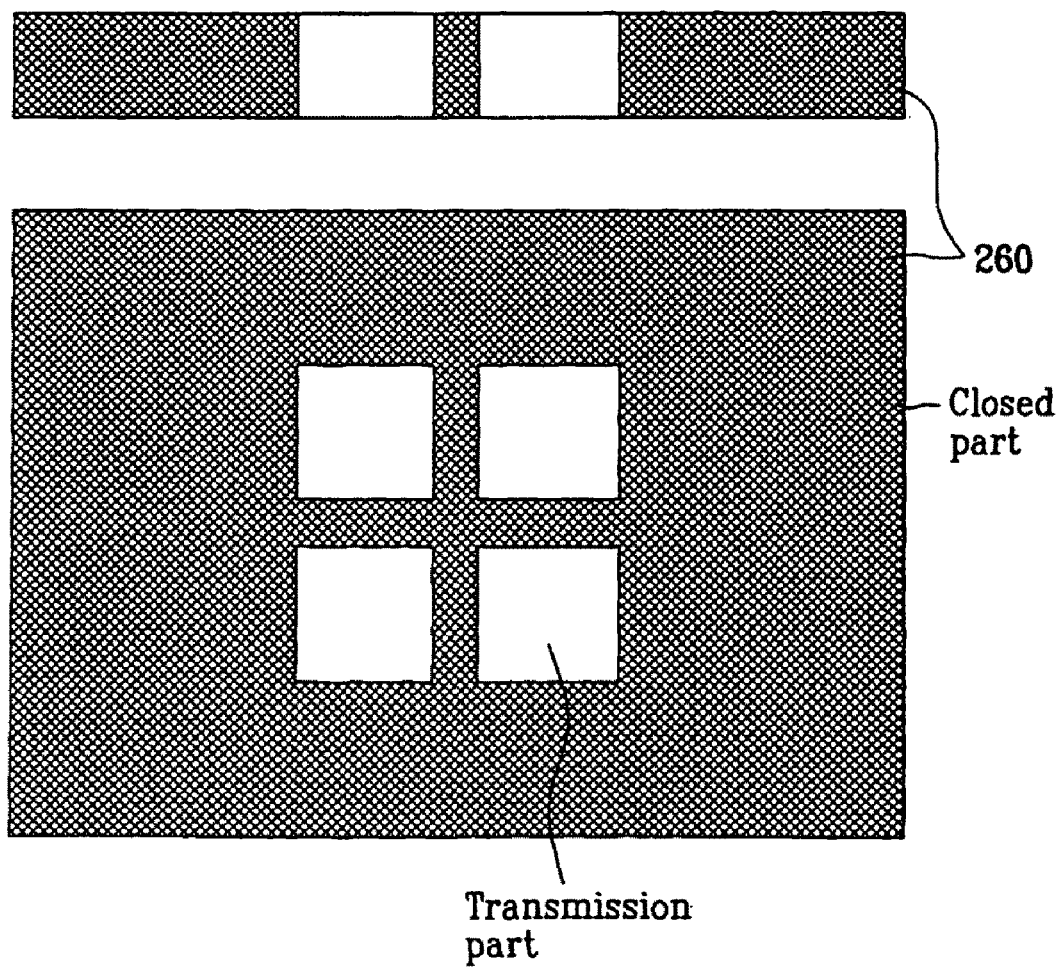
FIG. 21B is a schematic view of a mask for exposing portions of the color filter array substrate in the process for fabricating a column spacer of an LCD device according to another embodiment of the present invention.

FIG. 21B is a schematic view of a mask for exposing portions of the color filter array substrate in the process for fabricating a column spacer of an LCD device according to another embodiment of the present invention. Referring to FIG. 21B, an exposure mask 260 is prepared. The exposure mask 260 has a closed part and a transmission part therein. The closed part of the exposure mask 260 is provided facing an area corresponding to the column spacer to be fabricated. The transmission part is provided in the remaining portion excluding the column spacer.

To form the exposure mask 260, a light-shielding material, such as chrome (Cr), is deposited on portions of a quartz substrate corresponding to the closed part. The distance between the protrusions of the column spacer depends on the distance between the transmission parts of the exposure mask 260. Furthermore, the exposure mask 260 may be formed using a half-tone material. Thus, center and edge portions of the transmission part have different light transmittances. Accordingly, the negative photosensitive resin 202 may be exposed by gradation, in accordance with the different light transmittances in the center and edge portions of the transmission part.

Figure 21C:
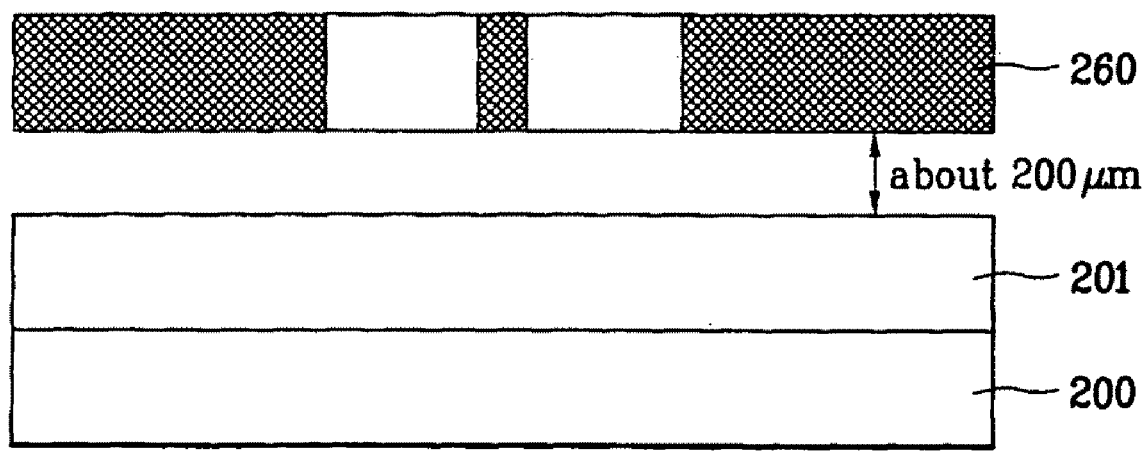
FIG. 21C is a cross-sectional view of an exposure step of the color filter array substrate in the process for fabricating a column spacer of an LCD device according to another embodiment of the present invention.

FIG. 21C is a cross-sectional view of an exposure step of the color filter array substrate in the process for fabricating a column spacer of an LCD device according to another embodiment of the present invention. Referring to FIG. 21C, the exposure mask 260 is provided above the color filter array substrate 200. Specifically, the exposure mask 260 is provided close to the negative photosensitive resin 202, at a specified distance thereof, for example about 200 μm. Then, the exposure process is performed. During the exposure process, it is important not to stain the mask 260 with the negative photosensitive resin 202. The exposed portion of the negative photosensitive resin 202 corresponds to the transmission part of the exposure mask 260.

Figure 21D:
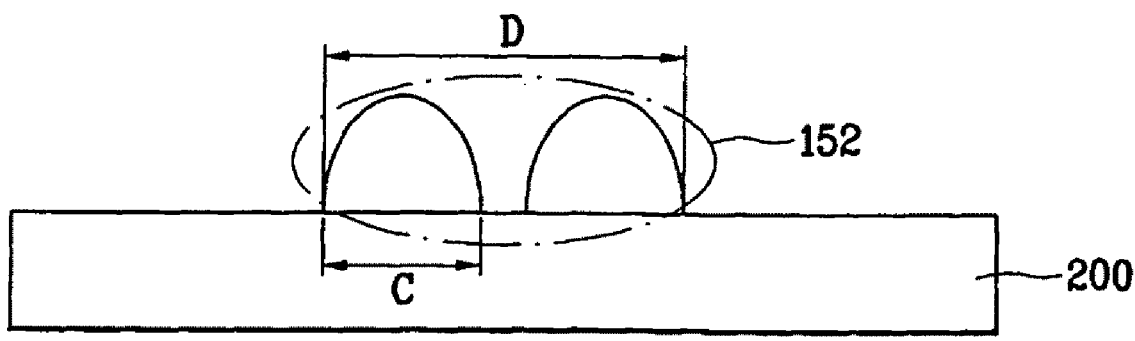
FIG. 21D is a cross-sectional view of an etching step of the color filter array substrate in the process for fabricating a column spacer of an LCD device according to another embodiment of the present invention.

FIG. 21D is a cross-sectional view of an etching step of the color filter array substrate in the process for fabricating a column spacer of an LCD device according to another embodiment of the present invention. Referring to FIG. 21D, after the exposure step, the negative photosensitive resin is developed using the exposure mask 260. An etchant is applied to the exposed portion of the negative photosensitive resin. The exposed portion of the negative photosensitive resin is removed by the etchant. The unexposed portion of the negative photosensitive resin corresponding to the closed part of the exposure mask remains.

Subsequently, the color filter array substrate including the patterned negative photosensitive resin is baked. The protruding contact surface of the negative photosensitive resin, which is patterned in the shape of the step difference, is rounded, thereby forming the column spacer 152 having the plurality of protrusions. In this case, the exposure and development process is performed with the mask 260 on which a half-tone material is deposited. During the exposure and development process, the half-tone material provides a difference in light transmittance between the center and edge portions of the transmission part. After the exposure and development process, the negative photosensitive resin is patterned to form the peak corresponding to the center portion of the transmission part, and the sloping surface from the peak to the edge portion. In an another embodiment of the present invention, the column spacer 152 may be formed with positive photosensitive resin, instead of negative photosensitive resin.

Figure 22A:
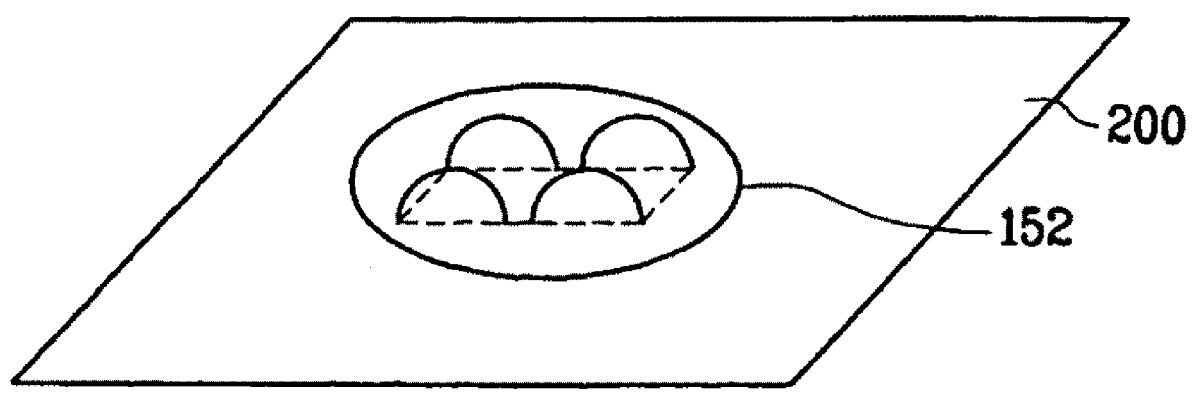
FIG. 22A is a perspective view of an exemplary column spacer according to an embodiment of the present invention.
Figure 22B:
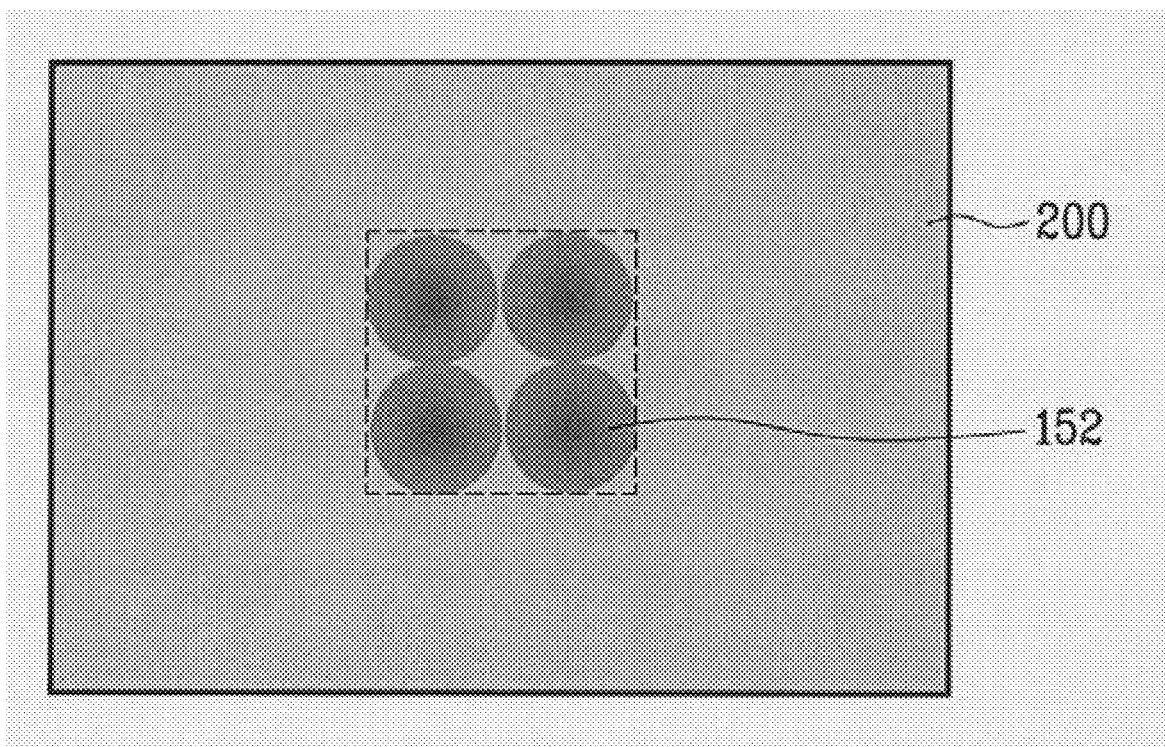
FIG. 22B is a top view of the exemplary column spacer of FIG. 22A.

FIG. 22A is a perspective view of an exemplary column spacer according to an embodiment of the present invention. FIG. 22B is a top view of the exemplary column spacer of FIG. 22A. In the LCD device, according to an embodiment of the present invention, the base surface of the column spacer 152 with the color filter array substrate 200 has a regular quadrilateral shape. The protruding contact surface of the column spacer with the TFT array substrate 100 is provided at fixed intervals with protrusions corresponding to the four corners of the regular quadrilateral.

The LCD device and the method for fabricating the same according to embodiments of the present invention have the following advantages. In the LCD device, the peaks of the protrusions, or the area surrounding the peaks of the protrusions on the column spacer, are in contact with the step difference part of the TFT array substrate. Thus, the contact area between the column spacer and the TFT array substrate is reduced. Hence, spots are not formed when the LCD panel is touched. Moreover, the applied pressure is concentrated on the contact points. Thus, gravity defect (an increase in margin of gravity) is prevented due to the increase in the pressure on the column spacer.

In embodiments of the present invention, while the shape of the protrusions and recesses of the column spacer of the LCD device are being changed, the density of the column spacers on the entire LCD panel can be maintained at a level similar to that of the related art.

In embodiments of the present invention, when pressure is applied to the bonded substrates, the load is concentrated on the corresponding contact area. As a result, the peak of the protrusion in the column spacer is pressed harder, compared with the related art. Thus, gravity margin is increased, thereby reducing gravity defect.

Moreover, in embodiments of the present invention, the column spacer contacts the TFT array substrate through the protrusions. The peaks or the surrounding portions of the protrusions in the column spacer formed on the color filter array substrate are in contact with the step difference part of the TFT array substrate. Thus, the contact area of the column spacer with the step difference part of the TFT array substrate is reduced. Hence, a vacuum state between the column spacer and the step difference part is prevented. Accordingly, the spots generated on the LCD panel by touch are easily removed.

It will be apparent to those skilled in the art that various modifications and variations can be made in the liquid crystal display device of the present invention, and the method for fabricating the same, without departing from the spirit or scope of the invention. Thus, it is intended that the present invention cover the modifications and variations of this invention provided they come within the scope of the appended claims and their equivalents.

What is claimed is:

1. A method for fabricating a liquid crystal display device comprising:
  forming a step difference part on a TFT array substrate, wherein the step difference part is relatively higher than other portion and the step difference part includes a double structure of a semiconductor layer and a metal layer, being sequentially formed;
  preparing a color filter array substrate facing the TFT array substrate;
  coating a photosensitive resin on an entire surface of the color filter array substrate;
  forming a column spacer having a plurality of protrusions facing the step difference part of the TFT array substrate by exposing and developing the photosensitive resin;
  dispensing liquid crystal on the TFT array substrate; and
  bonding the TFT array substrate and the color filter array substrate to each other.

2. The method of claim 1, wherein forming the column spacer includes:
  preparing a mask having a closed part, a semi-transmission part and a transmission part, above the photosensitive resin, wherein the closed part and the semi-transmission part are selectively formed to face a portion of the photosensitive resin corresponding to the step difference part, and the transmission part is formed to face a remaining portion excluding the step difference part; and
  forming the protrusions and the recesses of the column spacer respectively facing the closed part and the semi-transmission part of the mask by selectively removing corresponding portions of the photosensitive resin.

3. The method of claim 2, wherein the photosensitive resin includes a negative photosensitive resin.

4. The method of claim 2, wherein the mask includes a diffraction exposure mask.

5. The method of claim 2, wherein the mask includes a half-tone mask.

6. A method for fabricating a liquid crystal display device comprising:
  forming a step difference part on a TFT array substrate, wherein the step difference part is relatively higher than other portion and the step difference part includes a double structure of a semiconductor layer and a metal layer, being sequentially formed;
  preparing a color filter array substrate facing the TFT array substrate;
  coating a photosensitive resin on an entire surface of the color filter array substrate;
  forming a column spacer having a plurality of protrusions facing the step difference part of the TFT array substrate by selectively removing the photosensitive resin;
  dispensing liquid crystal on the TFT array substrate; and
  bonding the TFT array substrate and the color filter array substrate to each other.

7. The method of claim 6, wherein forming the column spacer includes:
  preparing a mask having a plurality of transmission parts and a closed part, above the photosensitive resin, wherein transmission parts are provided at fixed intervals, the transmission parts facing a portion of the step difference part, and the closed part facing a remaining portion of the photosensitive resin excluding the step difference part; and
  forming a recess on the column spacer by selectively removing the photosensitive resin, the recess facing the transmission part of the mask.

8. The method of claim 7, wherein the photosensitive resin includes a negative photosensitive resin.

9. The method of claim 7, wherein a half-tone material is additionally formed on an edge portion of the transmission part of the mask, so that a light transmittance corresponding to a center portion of the transmission part is relatively higher than the light transmittance corresponding to the edge portion of the transmission part.

* * * * *